US008762497B2

(12) United States Patent
Hansen

(10) Patent No.: US 8,762,497 B2
(45) Date of Patent: Jun. 24, 2014

(54) RETRIEVING DATA FROM A SERVER

(75) Inventor: James R. Hansen, Franklin, MA (US)

(73) Assignee: Axeda Corporation, Foxboro, MA (US)

(*) Notice: Subject to any disclaimer, the term of this patent is extended or adjusted under 35 U.S.C. 154(b) by 0 days.

(21) Appl. No.: 13/329,928

(22) Filed: Dec. 19, 2011

(65) Prior Publication Data

US 2012/0158914 A1    Jun. 21, 2012

Related U.S. Application Data

(63) Continuation of application No. 10/124,181, filed on Apr. 17, 2002, now Pat. No. 8,108,543, which is a continuation-in-part of application No. 09/667,737, filed on Sep. 22, 2000, now Pat. No. 7,185,014.

(51) Int. Cl.
*G06F 15/16* (2006.01)
*G06F 17/30* (2006.01)

(52) U.S. Cl.
CPC ............................ *G06F 17/30861* (2013.01)
USPC .......................... 709/219; 709/203; 709/221

(58) Field of Classification Search
USPC ................................ 709/201–203, 217–236
See application file for complete search history.

(56) References Cited

U.S. PATENT DOCUMENTS

| 4,086,434 | A | 4/1978 | Bocchi |
| 4,412,292 | A | 10/1983 | Sedam et al. |
| 4,497,037 | A | 1/1985 | Kato et al. |
| 4,583,834 | A | 4/1986 | Seko et al. |
| 4,853,946 | A | 8/1989 | Elliott et al. |
| 4,962,368 | A | 10/1990 | Dobrzanski et al. |
| 4,964,065 | A | 10/1990 | Hicks et al. |
| 4,965,946 | A | 10/1990 | Hegedus et al. |
| 4,996,703 | A | 2/1991 | Gray |
| 5,038,319 | A | 8/1991 | Carter et al. |
| 5,057,866 | A | 10/1991 | Hill, Jr. et al. |
| 5,061,837 | A | 10/1991 | Gilbert et al. |
| 5,077,582 | A | 12/1991 | Kravette et al. |
| 5,084,875 | A | 1/1992 | Weinberger et al. |
| 5,129,080 | A | 7/1992 | Smith |
| 5,138,377 | A | 8/1992 | Smith et al. |
| 5,163,151 | A | 11/1992 | Bronikowski et al. |

(Continued)

FOREIGN PATENT DOCUMENTS

| EP | 0874306 | 10/1998 |
| EP | 1 191 744 | 3/2002 |

(Continued)

OTHER PUBLICATIONS

"Frequently Asked Questions about the Extensible Markup Language—The XML FAQ" Version 1.41 (http://www.oasis-open.org/cover/xmlFAQ141-19981006.html) (Oct. 6, 1998).

(Continued)

*Primary Examiner* — Yasin Barqadle
(74) *Attorney, Agent, or Firm* — Fish & Richardson P.C.

(57) ABSTRACT

A system includes a server and a controller embedded in a device. Both the server and the embedded controller are capable of communicating over a computer network. The embedded controller sends a command to the server over the computer network that identifies an instance of the device. In response, the server identifies the instance of the device based on the command, retrieves data that is specific to the instance of the device, and sends the data to the embedded controller over the computer network.

33 Claims, 3 Drawing Sheets

(56) References Cited

U.S. PATENT DOCUMENTS

| | | |
|---|---|---|
| 5,184,179 A | 2/1993 | Tarr et al. |
| 5,204,699 A | 4/1993 | Birnbaum et al. |
| 5,212,645 A | 5/1993 | Wildes et al. |
| 5,214,772 A | 5/1993 | Weinberger et al. |
| 5,216,461 A | 6/1993 | Maekawa et al. |
| 5,220,380 A | 6/1993 | Hirata et al. |
| 5,224,157 A | 6/1993 | Yamada et al. |
| 5,243,382 A | 9/1993 | Takano et al. |
| 5,257,069 A | 10/1993 | Hirata et al. |
| 5,261,061 A | 11/1993 | Ju |
| 5,270,775 A | 12/1993 | Suzuki |
| 5,282,127 A | 1/1994 | Mii |
| 5,291,244 A | 3/1994 | Kajiwara et al. |
| 5,293,196 A | 3/1994 | Kaneko et al. |
| 5,297,034 A | 3/1994 | Weinstein |
| 5,297,256 A | 3/1994 | Wolstenholme et al. |
| 5,300,980 A | 4/1994 | Maekawa et al. |
| 5,303,005 A | 4/1994 | Takano et al. |
| 5,305,055 A | 4/1994 | Ebner et al. |
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,430,709 A | 7/1995 | Galloway |
| 5,434,650 A | 7/1995 | Nakahara et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,485,142 A | 1/1996 | Stute et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,528,691 A | 6/1996 | Rosauer et al. |
| 5,530,899 A | 6/1996 | MacDonald |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,579,087 A | 11/1996 | Salgado |
| 5,586,254 A | 12/1996 | Kondo et al. |
| 5,594,529 A | 1/1997 | Yamashita et al. |
| 5,600,301 A | 2/1997 | Robinson, III |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,619,716 A | 4/1997 | Nonaka et al. |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,696,903 A | 12/1997 | Mahany |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,727,248 A | 3/1998 | Ogura |
| 5,732,212 A | 3/1998 | Perholtz et al. |
| 5,736,965 A | 4/1998 | Mosebrook et al. |
| 5,740,801 A | 4/1998 | Branson |
| 5,745,268 A | 4/1998 | Eastvold et al. |
| 5,748,892 A | 5/1998 | Richardson |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,826,027 A | 10/1998 | Pedersen et al. |
| 5,828,943 A | 10/1998 | Brown |
| 5,835,816 A | 11/1998 | Sawada et al. |
| 5,835,911 A | 11/1998 | Nakagawa et al. |
| 5,844,550 A | 12/1998 | Trainor et al. |
| 5,845,061 A | 12/1998 | Miyamoto et al. |
| 5,845,230 A | 12/1998 | Lamberson |
| 5,857,207 A | 1/1999 | Lo et al. |
| 5,857,967 A | 1/1999 | Frid et al. |
| 5,862,348 A | 1/1999 | Pedersen |
| 5,862,404 A | 1/1999 | Onaga |
| 5,865,745 A | 2/1999 | Schmitt et al. |
| 5,872,635 A | 2/1999 | Akiyama |
| 5,872,928 A | 2/1999 | Lewis et al. |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |

(56) References Cited

U.S. PATENT DOCUMENTS

| | | |
|---|---|---|
| 5,909,493 A | 6/1999 | Motoyama et al. |
| 5,911,095 A | 6/1999 | Atsumi et al. |
| 5,913,060 A | 6/1999 | Discavage |
| 5,917,405 A | 6/1999 | Joao |
| 5,923,842 A | 7/1999 | Pedersen et al. |
| 5,933,675 A | 8/1999 | Sawada et al. |
| 5,935,060 A | 8/1999 | Iliff |
| 5,941,949 A | 8/1999 | Pedersen |
| 5,956,487 A | 9/1999 | Venkatraman et al. |
| 5,956,698 A | 9/1999 | Lachese et al. |
| 5,961,586 A | 10/1999 | Pedersen |
| 5,968,116 A | 10/1999 | Day et al. |
| 5,970,149 A | 10/1999 | Johnson |
| 5,974,234 A | 10/1999 | Levine et al. |
| 5,975,737 A | 11/1999 | Crater et al. |
| 5,991,810 A | 11/1999 | Shapiro et al. |
| 6,003,061 A | 12/1999 | Jones et al. |
| 6,003,070 A | 12/1999 | Frantz |
| 6,003,078 A | 12/1999 | Kodimer et al. |
| 6,006,045 A | 12/1999 | Miyawaki |
| 6,009,274 A | 12/1999 | Fletcher et al. |
| 6,009,284 A | 12/1999 | Weinberger et al. |
| 6,012,088 A | 1/2000 | Li et al. |
| 6,014,631 A | 1/2000 | Teagarden et al. |
| 6,014,691 A | 1/2000 | Brewer et al. |
| 6,014,694 A | 1/2000 | Aharoni et al. |
| 6,016,535 A | 1/2000 | Krantz et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,023,721 A | 2/2000 | Cummings |
| 6,023,749 A | 2/2000 | Richardson |
| 6,025,925 A | 2/2000 | Davidson, Jr. et al. |
| 6,031,964 A | 2/2000 | Anderson |
| 6,041,041 A | 3/2000 | Ramanathan et al. |
| 6,042,111 A | 3/2000 | Rivers et al. |
| 6,057,857 A | 5/2000 | Bloomfield |
| 6,060,994 A | 5/2000 | Chen |
| 6,061,603 A | 5/2000 | Papadopoulos et al. |
| 6,064,915 A | 5/2000 | Kaneko et al. |
| 6,065,118 A | 5/2000 | Bull et al. |
| 6,081,623 A | 6/2000 | Bloomfield et al. |
| 6,088,718 A | 7/2000 | Altschuler et al. |
| 6,091,915 A | 7/2000 | Takagishi |
| 6,098,116 A | 8/2000 | Nixon et al. |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,118,899 A | 9/2000 | Bloomfield et al. |
| 6,119,934 A | 9/2000 | Kolls |
| 6,122,463 A | 9/2000 | Nagatani |
| 6,125,363 A | 9/2000 | Buzzeo et al. |
| 6,130,999 A | 10/2000 | Serizawa et al. |
| 6,139,177 A | 10/2000 | Venkatraman et al. |
| 6,141,737 A | 10/2000 | Krantz et al. |
| 6,152,365 A | 11/2000 | Kolls |
| 6,157,944 A | 12/2000 | Pedersen |
| 6,161,145 A | 12/2000 | Bainbridge |
| 6,167,432 A | 12/2000 | Jiang |
| 6,167,448 A | 12/2000 | Hemphill et al. |
| 6,172,683 B1 | 1/2001 | Bloomfield |
| 6,175,866 B1 | 1/2001 | Holloway et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,205,466 B1 | 3/2001 | Karp et al. |
| 6,209,048 B1 | 3/2001 | Wolff |
| 6,221,011 B1 | 4/2001 | Bardy |
| 6,226,650 B1 | 5/2001 | Mahajan et al. |
| 6,230,199 B1 | 5/2001 | Revashetti et al. |
| 6,246,485 B1 | 6/2001 | Brown et al. |
| 6,256,378 B1 | 7/2001 | Iggulden et al. |
| 6,256,668 B1 | 7/2001 | Slivka et al. |
| 6,260,148 B1 | 7/2001 | Aggarwal et al. |
| 6,260,248 B1 | 7/2001 | Cramer et al. |
| 6,282,454 B1 | 8/2001 | Papadopolous et al. |
| 6,282,711 B1 | 8/2001 | Halpern et al. |
| 6,286,038 B1 | 9/2001 | Reichmeyer et al. |
| 6,286,059 B1 | 9/2001 | Sugiura |
| 6,289,461 B1 | 9/2001 | Dixon |
| 6,292,828 B1 | 9/2001 | Williams |
| 6,295,527 B1 | 9/2001 | McCormack et al. |
| 6,298,457 B1 | 10/2001 | Rachlin et al. |
| 6,304,895 B1 | 10/2001 | Schneider et al. |
| 6,307,570 B1 | 10/2001 | Stergiades |
| 6,308,099 B1 | 10/2001 | Fox et al. |
| 6,311,024 B1 | 10/2001 | Serizawa et al. |
| 6,312,378 B1 | 11/2001 | Bardy |
| 6,317,570 B1 | 11/2001 | Uchida et al. |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,327,594 B1 | 12/2001 | Van Huben et al. |
| 6,336,135 B1 | 1/2002 | Niblett et al. |
| 6,338,086 B1 | 1/2002 | Curtis et al. |
| 6,343,320 B1 | 1/2002 | Fairchild et al. |
| 6,356,933 B2 | 3/2002 | Mitchell et al. |
| 6,356,949 B1 | 3/2002 | Katsandres et al. |
| 6,366,741 B1 | 4/2002 | Fukushima |
| 6,368,284 B1 | 4/2002 | Bardy |
| 6,370,436 B1 | 4/2002 | Howard et al. |
| 6,370,552 B1 | 4/2002 | Bloomfield |
| 6,370,570 B1 | 4/2002 | Muir et al. |
| 6,370,582 B1 | 4/2002 | Lim et al. |
| 6,377,162 B1 | 4/2002 | Delestienne et al. |
| 6,377,971 B1 | 4/2002 | Madden et al. |
| 6,381,557 B1 | 4/2002 | Babula et al. |
| 6,381,712 B1 | 4/2002 | Nemitz |
| 6,397,212 B1 | 5/2002 | Biffar |
| 6,401,116 B1 | 6/2002 | Okigami |
| 6,405,310 B1 | 6/2002 | Simpson |
| 6,406,426 B1 | 6/2002 | Reuss et al. |
| 6,412,026 B1 | 6/2002 | Graf |
| 6,415,023 B2 | 7/2002 | Iggulden |
| 6,415,392 B1 | 7/2002 | Suzuki et al. |
| 6,421,671 B1 | 7/2002 | Bryan et al. |
| 6,421,719 B1 * | 7/2002 | Lewis et al. .................. 709/224 |
| 6,426,798 B1 | 7/2002 | Yeung |
| 6,430,612 B1 | 8/2002 | Iizuka |
| 6,430,711 B1 | 8/2002 | Sekizawa |
| 6,434,572 B2 | 8/2002 | Derzay et al. |
| 6,437,692 B1 | 8/2002 | Petite et al. |
| 6,437,803 B1 | 8/2002 | Panasyuk et al. |
| 6,438,598 B1 | 8/2002 | Pedersen |
| 6,446,192 B1 | 9/2002 | Narasimhan et al. |
| 6,449,633 B1 | 9/2002 | Van et al. |
| 6,449,663 B1 | 9/2002 | Carney et al. |
| 6,453,127 B2 | 9/2002 | Wood et al. |
| 6,453,129 B1 | 9/2002 | Simpson et al. |
| 6,457,038 B1 | 9/2002 | Defosse |
| 6,462,831 B1 | 10/2002 | Akiyama |
| 6,466,971 B1 | 10/2002 | Humpleman et al. |
| 6,467,084 B1 | 10/2002 | Howard et al. |
| 6,471,521 B1 | 10/2002 | Dornbush et al. |
| 6,477,117 B1 | 11/2002 | Narayanaswami et al. |
| 6,479,792 B1 | 11/2002 | Beiermann et al. |
| 6,487,513 B1 | 11/2002 | Eastvold et al. |
| 6,493,517 B1 | 12/2002 | Hanson |
| 6,493,871 B1 | 12/2002 | McGuire et al. |
| 6,494,831 B1 | 12/2002 | Koritzinsky |
| 6,510,350 B1 | 1/2003 | Steen et al. |
| 6,523,013 B2 | 2/2003 | Shah et al. |
| 6,523,063 B1 | 2/2003 | Miller et al. |
| 6,523,130 B1 | 2/2003 | Hickman et al. |
| 6,529,848 B2 | 3/2003 | Sone |
| 6,538,667 B1 | 3/2003 | Duursma et al. |
| 6,549,612 B2 | 4/2003 | Gifford et al. |
| 6,553,336 B1 | 4/2003 | Johnson et al. |
| 6,553,490 B1 | 4/2003 | Kottapurath et al. |
| 6,559,965 B1 | 5/2003 | Simpson et al. |
| 6,560,611 B1 | 5/2003 | Nine et al. |

(56) References Cited

U.S. PATENT DOCUMENTS

| | | |
|---|---|---|
| 6,560,641 B1 | 5/2003 | Powderly et al. |
| 6,560,656 B1 | 5/2003 | O'Sullivan et al. |
| 6,564,227 B2 | 5/2003 | Sakakibara et al. |
| 6,567,813 B1 | 5/2003 | Zhu et al. |
| 6,574,729 B1 | 6/2003 | Fink et al. |
| 6,581,092 B1 | 6/2003 | Motoyama et al. |
| 6,581,094 B1 | 6/2003 | Gao |
| 6,587,812 B1 | 7/2003 | Takayama |
| 6,587,879 B1 * | 7/2003 | Reynolds ...................... 709/224 |
| 6,591,272 B1 | 7/2003 | Williams |
| 6,598,011 B1 | 7/2003 | Howards Koritzinsky et al. |
| 6,598,083 B1 | 7/2003 | Remer et al. |
| 6,601,087 B1 | 7/2003 | Zhu et al. |
| 6,601,159 B1 | 7/2003 | Smith et al. |
| 6,604,212 B2 | 8/2003 | Sekizawa et al. |
| 6,609,108 B1 | 8/2003 | Pulliam et al. |
| 6,611,863 B1 | 8/2003 | Banginwar |
| 6,631,407 B1 | 10/2003 | Mukaiyama et al. |
| 6,636,899 B1 | 10/2003 | Rabb et al. |
| 6,643,650 B1 | 11/2003 | Slaughter et al. |
| 6,643,690 B2 | 11/2003 | Duursma et al. |
| 6,646,655 B1 | 11/2003 | Brandt et al. |
| 6,651,110 B1 | 11/2003 | Caspers et al. |
| 6,651,190 B1 | 11/2003 | Worley et al. |
| 6,654,032 B1 | 11/2003 | Zhu et al. |
| 6,654,720 B1 | 11/2003 | Graham et al. |
| 6,654,726 B1 | 11/2003 | Hanzek |
| 6,665,425 B1 | 12/2003 | Sampath et al. |
| 6,670,810 B2 | 12/2003 | Duncan et al. |
| 6,671,695 B2 | 12/2003 | McFadden |
| 6,681,344 B1 | 1/2004 | Andrew |
| 6,681,349 B2 | 1/2004 | Sekizawa |
| 6,684,259 B1 | 1/2004 | Discavage et al. |
| 6,686,838 B1 | 2/2004 | Rezvani et al. |
| 6,687,848 B1 | 2/2004 | Najmi |
| 6,687,873 B1 | 2/2004 | Ballantyne et al. |
| 6,691,106 B1 | 2/2004 | Sathyanarayan |
| 6,691,154 B1 | 2/2004 | Zhu et al. |
| 6,691,157 B2 | 2/2004 | Muir et al. |
| 6,704,807 B1 | 3/2004 | Mathur et al. |
| 6,710,893 B1 | 3/2004 | Hou et al. |
| 6,711,593 B1 | 3/2004 | Gordon et al. |
| 6,711,618 B1 | 3/2004 | Danner et al. |
| 6,717,513 B1 | 4/2004 | Sandelman et al. |
| 6,725,281 B1 | 4/2004 | Zintel et al. |
| 6,738,798 B1 | 5/2004 | Ploetz et al. |
| 6,754,664 B1 | 6/2004 | Bush |
| 6,757,714 B1 | 6/2004 | Hansen |
| 6,757,899 B2 | 6/2004 | Zdankin et al. |
| 6,760,761 B1 | 7/2004 | Sciacca |
| 6,763,501 B1 | 7/2004 | Zhu et al. |
| 6,766,333 B1 | 7/2004 | Wu et al. |
| 6,775,238 B1 | 8/2004 | Suzuki et al. |
| 6,779,004 B1 | 8/2004 | Zintel |
| 6,782,542 B1 | 8/2004 | Mein et al. |
| 6,785,015 B1 | 8/2004 | Smith et al. |
| 6,785,713 B1 | 8/2004 | Freeman et al. |
| 6,785,726 B1 | 8/2004 | Freeman et al. |
| 6,789,112 B1 | 9/2004 | Freeman et al. |
| 6,789,119 B1 | 9/2004 | Zhu et al. |
| 6,792,337 B2 | 9/2004 | Blackett et al. |
| 6,799,209 B1 | 9/2004 | Hayton |
| 6,799,270 B1 | 9/2004 | Bull et al. |
| RE38,609 E | 10/2004 | Chen et al. |
| 6,804,712 B1 | 10/2004 | Kracht |
| 6,807,580 B2 | 10/2004 | Freeman et al. |
| 6,810,488 B2 | 10/2004 | Teng |
| 6,816,616 B2 | 11/2004 | Teng |
| 6,823,397 B2 | 11/2004 | Rawson, III |
| 6,826,606 B2 | 11/2004 | Freeman et al. |
| 6,831,555 B1 | 12/2004 | Miller et al. |
| 6,832,239 B1 | 12/2004 | Kraft et al. |
| 6,832,373 B2 | 12/2004 | O'Neill |
| 6,834,298 B1 | 12/2004 | Singer et al. |
| 6,842,903 B1 | 1/2005 | Weschler |
| 6,857,013 B2 | 2/2005 | Ramberg et al. |
| 6,886,046 B2 | 4/2005 | Stutz et al. |
| 6,891,830 B2 | 5/2005 | Curtis |
| 6,901,448 B2 | 5/2005 | Zhu et al. |
| 6,904,593 B1 | 6/2005 | Fong et al. |
| 6,920,480 B2 | 7/2005 | Mitchell et al. |
| 6,922,724 B1 | 7/2005 | Freeman et al. |
| 6,925,335 B2 | 8/2005 | May et al. |
| 6,925,645 B2 | 8/2005 | Zhu et al. |
| 6,928,469 B1 | 8/2005 | Duursma et al. |
| 6,940,405 B2 | 9/2005 | Script et al. |
| 6,950,991 B2 | 9/2005 | Bloomfield et al. |
| 6,952,714 B2 | 10/2005 | Peart |
| 6,963,899 B1 | 11/2005 | Fernandez et al. |
| 6,972,676 B1 | 12/2005 | Kimmel et al. |
| 6,973,491 B1 * | 12/2005 | Staveley et al. ................ 709/224 |
| 6,983,020 B2 | 1/2006 | Christiansen |
| 6,985,779 B2 | 1/2006 | Hsiung et al. |
| 6,986,040 B1 | 1/2006 | Kramer et al. |
| 6,990,395 B2 | 1/2006 | Ransom et al. |
| 7,003,574 B2 | 2/2006 | Bahl |
| 7,016,966 B1 | 3/2006 | Saulpaugh et al. |
| 7,020,706 B2 | 3/2006 | Cates et al. |
| 7,020,773 B1 | 3/2006 | Otway et al. |
| 7,028,025 B2 | 4/2006 | Collins |
| 7,028,081 B2 | 4/2006 | Kawashima |
| 7,028,312 B1 | 4/2006 | Merrick et al. |
| 7,031,342 B2 | 4/2006 | Teng |
| 7,032,005 B2 | 4/2006 | Mathon et al. |
| 7,043,677 B1 | 5/2006 | Li |
| 7,046,134 B2 | 5/2006 | Hansen |
| 7,051,084 B1 | 5/2006 | Hayton et al. |
| 7,057,724 B1 | 6/2006 | Mead et al. |
| 7,065,576 B2 | 6/2006 | Kamel et al. |
| 7,069,298 B2 | 6/2006 | Zhu et al. |
| 7,072,946 B2 | 7/2006 | Shafer |
| 7,079,010 B2 | 7/2006 | Champlin |
| 7,080,267 B2 | 7/2006 | Gary et al. |
| 7,082,426 B2 | 7/2006 | Musgrove et al. |
| 7,082,460 B2 | 7/2006 | Hansen et al. |
| 7,085,814 B1 | 8/2006 | Gandhi et al. |
| 7,085,824 B2 | 8/2006 | Forth et al. |
| 7,089,567 B2 | 8/2006 | Giradot et al. |
| 7,091,846 B2 | 8/2006 | Wu |
| 7,092,370 B2 | 8/2006 | Jiang et al. |
| 7,099,110 B2 | 8/2006 | Detzler |
| 7,100,200 B2 | 8/2006 | Pope et al. |
| 7,103,357 B2 | 9/2006 | Kirani et al. |
| 7,103,799 B2 | 9/2006 | Dixon |
| 7,113,988 B2 | 9/2006 | Chirashya et al. |
| 7,116,681 B1 | 10/2006 | Hovell et al. |
| 7,117,239 B1 | 10/2006 | Hansen |
| 7,117,243 B2 | 10/2006 | Peart |
| 7,127,525 B2 | 10/2006 | Coleman et al. |
| 7,130,883 B2 | 10/2006 | Zhu et al. |
| 7,142,839 B2 | 11/2006 | Pelaez et al. |
| 7,149,792 B1 | 12/2006 | Hansen |
| 7,158,483 B1 | 1/2007 | Takabatake et al. |
| 7,162,315 B2 | 1/2007 | Gilbert |
| 7,162,628 B2 | 1/2007 | Gentil et al. |
| 7,178,149 B2 | 2/2007 | Hansen |
| 7,185,014 B1 | 2/2007 | Hansen |
| 7,194,743 B2 | 3/2007 | Hayton et al. |
| 7,200,578 B2 | 4/2007 | Paltenghe et al. |
| 7,203,755 B2 | 4/2007 | Zhu et al. |
| 7,213,051 B2 | 5/2007 | Zhu et al. |
| 7,216,172 B2 | 5/2007 | Yang et al. |
| 7,234,943 B1 | 6/2007 | Aleali |
| 7,254,601 B2 | 8/2007 | Baller et al. |
| 7,266,526 B1 | 9/2007 | Drummond et al. |
| 7,290,061 B2 | 10/2007 | Lentini et al. |
| 7,293,176 B2 | 11/2007 | Otway et al. |
| 7,330,872 B2 | 2/2008 | Peart et al. |
| 7,334,119 B2 | 2/2008 | Gentil et al. |
| 7,340,772 B2 | 3/2008 | Panasyuk et al. |
| 7,346,842 B1 | 3/2008 | Hayton et al. |
| 7,353,253 B1 | 4/2008 | Zhao |
| 7,359,953 B2 | 4/2008 | Muir et al. |
| 7,376,695 B2 | 5/2008 | Duursma et al. |

(56) References Cited

U.S. PATENT DOCUMENTS

| | | |
|---|---|---|
| 7,421,484 B2 | 9/2008 | Das |
| 7,444,071 B2 | 10/2008 | Chen |
| 7,453,379 B2 | 11/2008 | Plamondon |
| 7,460,038 B2 | 12/2008 | Samuels et al. |
| 7,490,166 B2 | 2/2009 | Yang et al. |
| 7,496,097 B2 | 2/2009 | Rao et al. |
| 7,502,726 B2 | 3/2009 | Panasyuk et al. |
| 7,502,784 B2 | 3/2009 | Collins |
| 7,506,048 B1 | 3/2009 | Motoyama |
| 7,529,767 B2 | 5/2009 | DeAnna et al. |
| 7,532,134 B2 | 5/2009 | Samuels et al. |
| 7,542,471 B2 | 6/2009 | Samuels et al. |
| 7,555,529 B2 | 6/2009 | Bloomfield et al. |
| 7,562,121 B2 | 7/2009 | Berisford |
| 7,562,146 B2 | 7/2009 | Panasyuk et al. |
| 7,562,226 B2 | 7/2009 | Aiken et al. |
| 7,565,526 B1 | 7/2009 | Shaw et al. |
| 7,581,005 B2 | 8/2009 | Montemayor et al. |
| 7,584,294 B2 | 9/2009 | Plamondon |
| 7,587,755 B2 | 9/2009 | Kramer |
| 7,593,514 B1 | 9/2009 | Zhuang et al. |
| 7,594,018 B2 | 9/2009 | Pedersen |
| 7,596,593 B2 | 9/2009 | Mitchell et al. |
| 7,606,902 B2 | 10/2009 | Rao et al. |
| 7,609,721 B2 | 10/2009 | Rao et al. |
| 7,613,131 B2 | 11/2009 | Decasper et al. |
| 7,617,531 B1 | 11/2009 | Chauhan et al. |
| 7,619,545 B2 | 11/2009 | Samuels et al. |
| 7,656,799 B2 | 2/2010 | Samuels et al. |
| 7,657,657 B2 | 2/2010 | Rao et al. |
| 7,661,129 B2 | 2/2010 | Panasyuk et al. |
| 7,661,131 B1 | 2/2010 | Shaw et al. |
| 7,664,857 B2 | 2/2010 | Ovsiannikov et al. |
| 7,676,813 B2 | 3/2010 | Bisset et al. |
| 7,937,370 B2 | 5/2011 | Hansen |
| 7,966,418 B2 * | 6/2011 | Shedrinsky |
| 8,055,758 B2 | 11/2011 | Hansen |
| 8,060,886 B2 | 11/2011 | Hansen |
| 8,108,543 B2 | 1/2012 | Hansen |
| 2001/0007117 A1 | 7/2001 | Cooper et al. |
| 2001/0011250 A1 | 8/2001 | Paltenghe et al. |
| 2001/0025377 A1 | 9/2001 | Hinderks |
| 2001/0027439 A1 | 10/2001 | Holtzman et al. |
| 2001/0049690 A1 | 12/2001 | McConnell et al. |
| 2001/0049717 A1 | 12/2001 | Freeman et al. |
| 2001/0052999 A1 | 12/2001 | Hiraoka et al. |
| 2002/0006790 A1 | 1/2002 | Blumenstock et al. |
| 2002/0019844 A1 | 2/2002 | Kurowski et al. |
| 2002/0026514 A1 | 2/2002 | Ellis et al. |
| 2002/0032470 A1 | 3/2002 | Linberg |
| 2002/0032720 A1 | 3/2002 | Nelson et al. |
| 2002/0035533 A1 | 3/2002 | Mache et al. |
| 2002/0038320 A1 | 3/2002 | Brook |
| 2002/0054169 A1 | 5/2002 | Richardson |
| 2002/0059489 A1 | 5/2002 | Davis et al. |
| 2002/0064138 A1 | 5/2002 | Saito et al. |
| 2002/0078135 A1 | 6/2002 | Venkatsubra |
| 2002/0078259 A1 | 6/2002 | Wendorf et al. |
| 2002/0080391 A1 | 6/2002 | Sugiura et al. |
| 2002/0095600 A1 | 7/2002 | Deen |
| 2002/0116550 A1 | 8/2002 | Hansen |
| 2002/0133753 A1 | 9/2002 | Mayberry et al. |
| 2002/0135801 A1 | 9/2002 | Tessman |
| 2002/0138567 A1 | 9/2002 | Ogawa |
| 2002/0144016 A1 | 10/2002 | Spicer et al. |
| 2002/0157090 A1 | 10/2002 | Anton, Jr. |
| 2002/0174085 A1 | 11/2002 | Nelson et al. |
| 2002/0178241 A1 * | 11/2002 | Eriksson ............... 709/222 |
| 2002/0191612 A1 | 12/2002 | Curtis |
| 2003/0014733 A1 | 1/2003 | Ringseth et al. |
| 2003/0023957 A1 | 1/2003 | Bau et al. |
| 2003/0025931 A1 | 2/2003 | Dorfman et al. |
| 2003/0037148 A1 | 2/2003 | Pedersen |
| 2003/0056140 A1 | 3/2003 | Taylor et al. |
| 2003/0061403 A1 | 3/2003 | Miyata et al. |
| 2003/0063309 A1 | 4/2003 | Parry |
| 2003/0070006 A1 | 4/2003 | Nadler et al. |
| 2003/0072027 A1 | 4/2003 | Haines et al. |
| 2003/0118353 A1 | 6/2003 | Baller |
| 2003/0136837 A1 | 7/2003 | Amon et al. |
| 2003/0140234 A1 | 7/2003 | Noda et al. |
| 2003/0154284 A1 | 8/2003 | Bernardin et al. |
| 2003/0158897 A1 | 8/2003 | Ben-Natan et al. |
| 2003/0158919 A1 | 8/2003 | Fomenko |
| 2003/0163569 A1 | 8/2003 | Panasyuk et al. |
| 2003/0177172 A1 | 9/2003 | Duursma et al. |
| 2003/0182375 A1 | 9/2003 | Zhu et al. |
| 2003/0200285 A1 | 10/2003 | Hansen et al. |
| 2003/0200329 A1 | 10/2003 | Delaney |
| 2003/0229529 A1 | 12/2003 | Mui et al. |
| 2003/0229785 A1 | 12/2003 | Daseke et al. |
| 2004/0027376 A1 | 2/2004 | Calder et al. |
| 2004/0098515 A1 | 5/2004 | Rezvani et al. |
| 2004/0128370 A1 | 7/2004 | Kortright |
| 2004/0139309 A1 | 7/2004 | Gentil et al. |
| 2004/0152450 A1 | 8/2004 | Brasher et al. |
| 2004/0158630 A1 | 8/2004 | Chang et al. |
| 2004/0158631 A1 | 8/2004 | Chang et al. |
| 2004/0177124 A1 | 9/2004 | Hansen |
| 2004/0186693 A1 | 9/2004 | Xiang et al. |
| 2004/0215605 A1 | 10/2004 | Mester |
| 2004/0221026 A1 | 11/2004 | Dorland |
| 2004/0252628 A1 | 12/2004 | Detzler |
| 2004/0260801 A1 | 12/2004 | Li |
| 2005/0005152 A1 | 1/2005 | Singh et al. |
| 2005/0015501 A1 | 1/2005 | Kaplan et al. |
| 2005/0021772 A1 | 1/2005 | Shedrinski |
| 2005/0033588 A1 | 2/2005 | Ruiz et al. |
| 2005/0044196 A1 | 2/2005 | Pullen et al. |
| 2005/0055397 A1 | 3/2005 | Zhu et al. |
| 2005/0080897 A1 | 4/2005 | Braun et al. |
| 2005/0086172 A1 | 4/2005 | Stefik |
| 2005/0102388 A1 | 5/2005 | Tabbara et al. |
| 2005/0119930 A1 | 6/2005 | Simon |
| 2005/0141507 A1 | 6/2005 | Curtis |
| 2005/0144612 A1 | 6/2005 | Wang et al. |
| 2005/0154787 A1 | 7/2005 | Cochran et al. |
| 2005/0190769 A1 | 9/2005 | Smith |
| 2005/0193099 A1 | 9/2005 | Reus et al. |
| 2005/0193386 A1 | 9/2005 | McCaleb et al. |
| 2005/0196023 A1 | 9/2005 | Chen et al. |
| 2005/0198189 A1 | 9/2005 | Robinson et al. |
| 2005/0198245 A1 | 9/2005 | Burgess et al. |
| 2005/0198292 A1 | 9/2005 | Duursma et al. |
| 2005/0198379 A1 | 9/2005 | Panasyuk et al. |
| 2005/0198380 A1 | 9/2005 | Panasyuk et al. |
| 2005/0198393 A1 | 9/2005 | Stutz et al. |
| 2005/0232168 A1 | 10/2005 | Schauser et al. |
| 2005/0235014 A1 | 10/2005 | Schauser et al. |
| 2005/0246445 A1 | 11/2005 | Panasyuk et al. |
| 2005/0246702 A1 | 11/2005 | Yeh et al. |
| 2005/0256614 A1 | 11/2005 | Habermas |
| 2005/0256923 A1 | 11/2005 | Adachi |
| 2005/0262076 A1 | 11/2005 | Voskuil |
| 2005/0267974 A1 | 12/2005 | Panasyuk et al. |
| 2005/0273513 A1 | 12/2005 | Panasyuk et al. |
| 2006/0002315 A1 | 1/2006 | Theurer et al. |
| 2006/0015740 A1 | 1/2006 | Kramer |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031237 A1 | 2/2006 | DeAnna et al. |
| 2006/0031476 A1 | 2/2006 | Mathes et al. |
| 2006/0031779 A1 | 2/2006 | Theurer et al. |
| 2006/0037022 A1 | 2/2006 | Byrd et al. |
| 2006/0037071 A1 | 2/2006 | Rao et al. |
| 2006/0037072 A1 | 2/2006 | Rao et al. |
| 2006/0039354 A1 | 2/2006 | Rao et al. |
| 2006/0039355 A1 | 2/2006 | Rao et al. |
| 2006/0039356 A1 | 2/2006 | Rao et al. |
| 2006/0039404 A1 | 2/2006 | Rao et al. |
| 2006/0047956 A1 | 3/2006 | Calvin |
| 2006/0059239 A1 | 3/2006 | Brasher et al. |
| 2006/0066448 A1 | 3/2006 | Berisford et al. |

(56) References Cited

U.S. PATENT DOCUMENTS

| | | |
|---|---|---|
| 2006/0069668 A1 | 3/2006 | Braddy et al. |
| 2006/0069683 A1 | 3/2006 | Braddy et al. |
| 2006/0069750 A1 | 3/2006 | Momtchilov et al. |
| 2006/0069753 A1 | 3/2006 | Hu et al. |
| 2006/0070029 A1 | 3/2006 | Laborczfalvi et al. |
| 2006/0070090 A1 | 3/2006 | Gulkis |
| 2006/0070131 A1 | 3/2006 | Braddy et al. |
| 2006/0074837 A1 | 4/2006 | Braddy et al. |
| 2006/0075080 A1 | 4/2006 | Burr et al. |
| 2006/0075114 A1 | 4/2006 | Panasyuk et al. |
| 2006/0075123 A1 | 4/2006 | Burr et al. |
| 2006/0075381 A1 | 4/2006 | Laborczfalvi et al. |
| 2006/0075463 A1 | 4/2006 | Braddy et al. |
| 2006/0077941 A1 | 4/2006 | Alagappan et al. |
| 2006/0087408 A1 | 4/2006 | Korzeniowski |
| 2006/0087409 A1 | 4/2006 | Korzeniowski |
| 2006/0090171 A1 | 4/2006 | Laborczfalvi et al. |
| 2006/0095334 A1 | 5/2006 | Simmons |
| 2006/0095370 A1 | 5/2006 | Seth et al. |
| 2006/0100972 A1 | 5/2006 | Chianese et al. |
| 2006/0135192 A1 | 6/2006 | Surendra et al. |
| 2006/0016974 A1 | 7/2006 | Innes et al. |
| 2006/0150249 A1 | 7/2006 | Gassen et al. |
| 2006/0159080 A1 | 7/2006 | Mazzaferri |
| 2006/0159432 A1 | 7/2006 | Mazzaferri |
| 2006/0161555 A1 | 7/2006 | Mazzaferri |
| 2006/0161671 A1 | 7/2006 | Ryman et al. |
| 2006/0161783 A1 | 7/2006 | Aiken et al. |
| 2006/0161959 A1 | 7/2006 | Ryman et al. |
| 2006/0179143 A1 | 8/2006 | Walker et al. |
| 2006/0184614 A1 | 8/2006 | Baratto et al. |
| 2006/0190719 A1 | 8/2006 | Rao et al. |
| 2006/0200307 A1 | 9/2006 | Riess |
| 2006/0200494 A1 | 9/2006 | Sparks |
| 2006/0203007 A1 | 9/2006 | Bullard et al. |
| 2006/0206820 A1 | 9/2006 | Bullard et al. |
| 2006/0224742 A1 | 10/2006 | Shabazi et al. |
| 2006/0236325 A1 | 10/2006 | Rao et al. |
| 2006/0236385 A1 | 10/2006 | Innes et al. |
| 2006/0242415 A1 | 10/2006 | Gaylor |
| 2006/0247502 A1 | 11/2006 | Chen |
| 2006/0248144 A1 | 11/2006 | Zhu et al. |
| 2006/0271875 A1 | 11/2006 | Green et al. |
| 2006/0271877 A1 | 11/2006 | Theurer et al. |
| 2006/0282521 A1 | 12/2006 | Anderson et al. |
| 2007/0005736 A1 | 1/2007 | Hansen et al. |
| 2007/0011295 A1 | 1/2007 | Hansen |
| 2007/0011356 A1 | 1/2007 | Schauser et al. |
| 2007/0022159 A1 | 1/2007 | Zhu |
| 2007/0056009 A1 | 3/2007 | Spilo et al. |
| 2007/0077917 A1 | 4/2007 | Kim |
| 2007/0078976 A1 | 4/2007 | Taylor et al. |
| 2007/0088826 A1 | 4/2007 | Raphel et al. |
| 2007/0094076 A1 | 4/2007 | Perkowski et al. |
| 2007/0094672 A1 | 4/2007 | Hayton et al. |
| 2007/0100892 A1 | 5/2007 | Kephart et al. |
| 2007/0106810 A1 | 5/2007 | Ryman |
| 2007/0106811 A1 | 5/2007 | Ryman |
| 2007/0113069 A1 | 5/2007 | Gentil et al. |
| 2007/0130167 A1 | 6/2007 | Day et al. |
| 2007/0130337 A1 | 6/2007 | Arnison |
| 2007/0143837 A1 | 6/2007 | Azeez et al. |
| 2007/0150903 A1 | 6/2007 | Hansen |
| 2007/0156810 A1 | 7/2007 | Kumar |
| 2007/0156923 A1 | 7/2007 | Kumar |
| 2007/0157101 A1 | 7/2007 | Indiran et al. |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0174454 A1 | 7/2007 | Mitchell et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0198661 A1 | 8/2007 | Hansen |
| 2007/0203952 A1 | 8/2007 | Baron et al. |
| 2007/0239886 A1 | 10/2007 | Montemayor et al. |
| 2007/0271599 A1 | 11/2007 | Rosenstein |
| 2007/0282623 A1 | 12/2007 | Dattorro |
| 2007/0288629 A2 | 12/2007 | Taylor et al. |
| 2007/0294237 A1 | 12/2007 | John et al. |
| 2008/0005321 A1 | 1/2008 | Ma et al. |
| 2008/0031235 A1 | 2/2008 | Harris et al. |
| 2008/0034057 A1 | 2/2008 | Kumar et al. |
| 2008/0034072 A1 | 2/2008 | He et al. |
| 2008/0034110 A1 | 2/2008 | Suganthi et al. |
| 2008/0034111 A1 | 2/2008 | Kamath et al. |
| 2008/0034119 A1 | 2/2008 | Verzunov et al. |
| 2008/0034410 A1 | 2/2008 | Udupa et al. |
| 2008/0034413 A1 | 2/2008 | He et al. |
| 2008/0034418 A1 | 2/2008 | Venkatraman et al. |
| 2008/0034419 A1 | 2/2008 | Mullick et al. |
| 2008/0043617 A1 | 2/2008 | Schekochikhin et al. |
| 2008/0043622 A1 | 2/2008 | Kamath et al. |
| 2008/0043749 A1 | 2/2008 | Suganthi et al. |
| 2008/0043760 A1 | 2/2008 | Venkatraman et al. |
| 2008/0043761 A1 | 2/2008 | Kumar et al. |
| 2008/0046371 A1 | 2/2008 | He et al. |
| 2008/0046616 A1 | 2/2008 | Verzunov et al. |
| 2008/0046714 A1 | 2/2008 | Suganthi et al. |
| 2008/0046717 A1 | 2/2008 | Kanekar et al. |
| 2008/0046727 A1 | 2/2008 | Kanekar et al. |
| 2008/0046994 A1 | 2/2008 | Venkatraman et al. |
| 2008/0049616 A1 | 2/2008 | Kamath et al. |
| 2008/0065757 A1 | 3/2008 | Motoyama et al. |
| 2008/0068289 A1 | 3/2008 | Piasecki |
| 2008/0068290 A1 | 3/2008 | Muklashy et al. |
| 2008/0069005 A1 | 3/2008 | von Eicken et al. |
| 2008/0069104 A1 | 3/2008 | von Eicken et al. |
| 2008/0071905 A1 | 3/2008 | Sullivan et al. |
| 2008/0082657 A1 | 4/2008 | Hart et al. |
| 2008/0109912 A1 | 5/2008 | Rivera |
| 2008/0126978 A1 | 5/2008 | Bai et al. |
| 2008/0154409 A1 | 6/2008 | Srikumar et al. |
| 2008/0154957 A1 | 6/2008 | Taylor et al. |
| 2008/0208605 A1 | 8/2008 | Sinha et al. |
| 2008/0219122 A1 | 9/2008 | Detzler et al. |
| 2008/0231414 A1 | 9/2008 | Canosa |
| 2008/0250110 A1 | 10/2008 | Zhao |
| 2009/0013064 A1 | 1/2009 | Taylor et al. |
| 2009/0019226 A1 | 1/2009 | Edwards et al. |
| 2009/0055745 A1 | 2/2009 | Christiansen |
| 2009/0064134 A1 | 3/2009 | Cox |
| 2009/0099836 A1 | 4/2009 | Jacobsen et al. |
| 2009/0100349 A1 | 4/2009 | Hancock |
| 2009/0106347 A1 | 4/2009 | Harwood et al. |
| 2009/0117890 A1 | 5/2009 | Jacobsen et al. |
| 2009/0119408 A1 | 5/2009 | Teze et al. |
| 2009/0187654 A1 | 7/2009 | Raja et al. |
| 2009/0234972 A1 | 9/2009 | Raghu et al. |
| 2009/0259728 A1 | 10/2009 | Berisford et al. |
| 2012/0143970 A1 | 6/2012 | Hansen |
| 2012/0158914 A1 | 6/2012 | Hansen |
| 2012/0158982 A1 | 6/2012 | Hansen |

FOREIGN PATENT DOCUMENTS

| | | |
|---|---|---|
| EP | 1 362 282 | 11/2003 |
| EP | 1 695 485 | 8/2006 |
| EP | 1305712 | 9/2006 |
| FR | 2797728 | 2/2001 |
| GB | 2305820 | 4/1997 |
| JP | 60-263162 | 12/1985 |
| JP | 1-61842 | 4/1989 |
| JP | 06-062130 | 3/1994 |
| JP | 07-325513 | 12/1995 |
| JP | 09-163008 | 6/1997 |
| JP | 09-305407 | 11/1997 |
| JP | 09-325925 | 12/1997 |

(56) References Cited

FOREIGN PATENT DOCUMENTS

| | | |
|---|---|---|
| JP | 10-190922 | 7/1998 |
| JP | 10-224372 | 8/1998 |
| JP | 11-045195 | 2/1999 |
| JP | 11-167540 | 6/1999 |
| JP | 11-203079 | 7/1999 |
| JP | 11-234271 | 8/1999 |
| JP | 11-238043 | 8/1999 |
| JP | 11-296453 | 10/1999 |
| JP | 10-295788 | 4/2000 |
| JP | 2000-112863 | 4/2000 |
| JP | 2000-122952 | 4/2000 |
| JP | 200122952 | 4/2000 |
| JP | 2000-163283 | 6/2000 |
| JP | 2000-194583 | 7/2000 |
| JP | 2000-278773 | 10/2000 |
| JP | 2000-309145 | 11/2000 |
| JP | 2001-154953 | 6/2001 |
| JP | 2001-337817 | 12/2001 |
| JP | 2001-344129 | 12/2001 |
| JP | 2003-140991 | 5/2003 |
| JP | 2003-223603 | 8/2003 |
| JP | 2006-277752 | 10/2006 |
| JP | 4808911 | 11/2011 |
| JP | 2013-058231 | 3/2013 |
| WO | WO97/30879 | 8/1997 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO99/57837 | 11/1999 |
| WO | WO99/57838 | 11/1999 |
| WO | WO99/64958 | 12/1999 |
| WO | WO2000/007099 | 2/2000 |
| WO | WO00/23894 | 4/2000 |
| WO | WO02/10919 | 2/2002 |
| WO | WO02/21239 | 3/2002 |
| WO | WO02/21299 | 3/2002 |
| WO | WO02/21414 | 3/2002 |
| WO | WO02/21415 | 3/2002 |
| WO | WO02/21777 | 3/2002 |
| WO | WO02/25501 | 3/2002 |
| WO | WO03/021464 | 3/2003 |
| WO | WO03/054439 | 7/2003 |
| WO | WO2004/059447 | 7/2004 |
| WO | WO2006/009402 | 1/2006 |
| WO | WO2008/083177 | 7/2008 |

OTHER PUBLICATIONS

24x7, HealthTech Publishing Company, Inc. (Nov. 1996).
"Remote Diagnostics: Strategic weapon in the war for multi-vendor service contracts," Tech Assessment, vol. 3, No. 12, Dec. 1995.
"Siemens Medical, BJC Health System Extend deal to multivendor service," Medical Imaging News, vol. 6, No. 26, Jun. 27, 1997.
Dec. 27, 1995, SCAN Diagnostic Imaging, vol. 8, No. 24.
Apr. 22, 2005 Literature Search by Keyword: CyberTAC.
Adelberg, D., "Building Robust Wrappers for Text Sources", [online] Retrieved from the Internet:<URL:http://student.bu.ac.bd/~mumit/Research/NLP-bib/papers/Adelberg99.pdf> [retrieved on Nov. 24, 2008] (1999).
Allegro Software product release 1-61 overview Greenhills Software Inc., [online] Jun. 10, 2002, pp. I-I, XPOO2201939 Retrieved from the Internet: <URL: http://www.ghs.com/partners/allegro/> [retrieved on Jun. 10, 2002] the whole document.
Allegro, RomWebCLient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/romwebclient.html.
Bock, G., "Mainstreaming XML-based Enterprise Applications: Using Oracle XML DB to Manage Financial Information within a Global Banking System", Oracle Corporation, (C) 2003.
Box, et al., Simple Object Acces Protocol (SOAP) 1.1, Document No. XP002250270, May 8, 2000.
Chandler, T. et al., "The Technology Development of Automatic Metering and Monitoring Systems", Int'l Power Engineering Conf. 2005, IEEE, 4 pgs.
Cheung, D. et al., "Distributed and Scalable XML Document Processing Architecture for E-Commerce Systems", Adv. Issues of E-Commerce and Web-Based Information Systems, WECWIS 2000, 2nd Int'l Workshop, (Jun. 2000), pp. 152-157.
Ennis, D., "CORBA and XML Integration in Enterprise Systems", IONA Technologies Inc.[online], Retrieved from the Internet:<URL:http://citeseer.ist.psu.edu/cache/papers/cs/16013/http:zSzzSzwww.iona.comzSzinfozSztechcenterzSzecoop2000apr17.pdf/ennis00corba.pdf> [retrieved on Nov. 24, 2008] (2000).
CyberTAC & RadScape Presentation (May 1997).
CyberTAC Design Presentation (1997).
CyberTAC from Virtual Impact Systems, Inc. Presentation (1997).
CyberTAC Remote Support System Presentation (1997).
Database WIP, Section EI, Week 200156, Abstract, Document No. XP002253876 (Korea Electronics & Telecom Res Inst.) Derwent Publications, Ltd., London, GB, (Mar. 2001).
Eastvold, Roger, "Services: The Next Generation," The Professional Journal, vol. 20, No. 4.
Eastvold, Roger, "Tiss and Tell," Medical Imaging, Sep. 1995.
EBITS:Electronic Business & Information Technology for Society Research Consortium, Proposal for Development of an Educational and Research Infrastructure for Safe Electronic Commerce, [online] Retrieved from the Internet:<URL:http://www.cs.dartmouth.edu/~makedon/cs188/proposal.html>, [retrieved Feb. 15, 2005].
Jiang, et al., "Record-Boundary Discovery in Web Documents", [online] Retrieved from the Internet:<URL:http://osm7.cs.byu.edu/deg/papers/SJ.Thesis.ps>, [retrieved on Nov. 24, 2008] (1998).
Emmerich et al., Implementing Incremental Code Migration with XML, IEEE, 4-11, (Jun. 2000).
EmWare Press Release: "emWare Announces Support for Sun Microsystems Jini Technology," Salt Lake City, UT (Feb. 1999).
EmWare Press Release: "emWare Delivers EMIT 3.0 SDK Pro—A Complete Device Networking Kit for Developing End-to-end, Embedded Device Networking Solutions," Salt Lake City, UT (May 1999).
EmWare Press Release: "emWare, IBM Demonstrate Next Phase in Establishing Worldwide Access to Embedded Devices," Chicago, IL (Mar. 1999).
EmWare Press Release: "emWare's emLink (TM) Used to Internet-enable Welch Allyn's Vital Signs Monitor," Chicago, IL (Mar. 1999).
EmWare Press Release: "Invensys Selects emWare EMIT Device-Networking Software to Add Remote Monitoring and Control Capabilities to its Controller Products," Salt Lake City, UT (Jun. 1999).
EmWare Press Release: "Motorola, Mitsubishi and National Semiconductor Join emWare's Embed the Internet Alliance," Chicago, IL (Mar. 1999).
Franklin, M. et al., "Data in Your Face: PUSH Technology in Perspective", Proc. ACM SIGMOND Int'l Conf. on Mgmt of Data, (Jun. 1998), #XP000886180, pp. 516-519.
Hanckmann, J., "Telescript: The Emerging Standard for Intelligent Messaging," Philips Telecommunications Review, vol. 52(1), pp. 15-19 (Mar. 1994).
Universal Plug & Play Device Architecture, (C) Microsoft Corporation (Jun. 8, 2000), [online] Retrieved from the Internet: <URL:http://www.upnp.org/specs/arch/upnpda10_20000613.htm>, [retrieved on Nov. 24, 2008].
Incremona, A. "Remote Service Diagnostics for Imaging Equipment: Today and Tomorrow," Advanced Imaging, 12(9):90(2) (1997).
Jennyc, Kenn S., "Linking Enterprise Business Systems to the Factory Floor," The Hewlett-Packard Journal, Article 9 (May 1998).
Kafeza, E. et al., "Alerts in Mobile Healthcare Applications: Requirements and Pilot Study", IEEE, vol. 8, No. 2, pp. 173-181 (Jun. 2004).
Kimball, R., "XML Will Make it Easier," Intelligent Enterprise, [online] Retrieved from the Internet:<URL:http://www.intelligententerprise.com/010416/webhouse1_1.jhtml> [retrieved on Nov. 24, 2008] (Apr. 16, 2001).

(56) References Cited

OTHER PUBLICATIONS

Koppen, E., et al., "Active Hypertext for Distributed Web Applications", Enabling Technologies: Infrastructure for Collaborative Enterprises, (WET ICE '99), Proc. IEEE 8th Int'l. Workshop (1999), pp. 297-302.
Kovar, J., "Xerox Unveils Expanded Channel Lineup; Also Plans to Introduce E-Mail, Queue Management Software," PC Expo,(Jun. 1999).
Lassman, M. et al., "Modern Nuclear Medical Diagnostics with Efficient Gamma Cameras," Electromedica, 66(2):43-51, (1998).
Lewandowska, J., et al., "System for Grouping Technologically Similar Devices", v. 48 n 12; (Dec. 1975), pp. 636-638 (English Abstract).
Layman, et al., "XML-Data," Position Paper from Microsoft Corp. (Jun. 1997), [online] Retrieved from the Internet:<URL:http://www.oasis-open.org/cover/xml-data9706223.html> [retrieved on Sep. 2, 2004].
Lerner, R., "At the Forge: Introducing SOAP", Linux Journal, #XP002292162 (Mar. 2001).
Lindley, D., "Xerox unveils copier that phones for help," Rochester Democrat and Chronicle, (Mar. 28, 1990).
Luh, James C., "With several specs complete, XML enters widespread development," Internet World, (Jan. 4, 1999).
Martin, D., "Protessional XML"., WROX Press Ltd., pub., Ch. 11, 'Server to Server', pp. 559-562, 819-820 (2000).
Mason, K., "XML Translation for block structured languages", IBM Corporation: Research Disclosure, Kenneth Mason Publications, 44176 (2001).
Math Markup Language (Chapter 4); [online] Retrieved from the Internet:<URL:http://www.w3.org/TR/REC-MathML/chap4_4.html>, [retrieved on Feb. 15, 2005].
McBride, R.A., "Security Considerations for Active Messages," ACM SIGICE Bulletin, vol. 22 (2), (Oct. 1996).
Memphis Educational Computer Connectivity Alliance (MECCA), [online] Retrieved from the Internet:<URL:http://www.mecca.org/~Itague/nsfnocostextension.html>, [retrieved on Feb. 15, 2005].
Mills et al., "A knowledge-based method for inferring semantic concepts from visual models of system behavior," ACM (Jul. 2000), pp. 306-337.
Orasis Medical Services, Inc., Business Plan Copy No. 001, (Nov. 1995).
Pfeiffer, R., "XML Tutorials for Programmers: Tutorial 2: Writing XML Documents," (1999) [online] Retrieved from the Internet:<URL:http://imb.com/xml>, [retrieved on Mar. 2, 1999].
Questra Applications Data Sheet (2002).
Questra Preliminary Invalidity Contentions, dated Apr. 29, 2005.
Reagan, K., "Technology for the Soul," OC Metro, (Sep. 1, 1995).
Rytting, T., "Dispensing the Goods, Embedded Style," Circuit Cellar Online, (Oct. 1999).
Schmidt, The Evolution of Workflow Standards, IEEE (1999).
SOAP Archives Online, "Multiple Method Calls in SOAP Packet"; [online] Retrieved from the Internet:<URL:http://discuss.develop.com/archives/wa.exe?A2=ind9912&L=soap&T=O&F=&S=&P=25113>, [retrieved on Dec. 8, 2000].
Steinfeld, E., "From Standalone to Internet Appliance", Circuit Cellar Online, [online] (Jul. 9, 2000), #XP002201938, Retrieved from the Internet: <URL:http://web.archive.org/web/20000709204234/http://www.alegrosoft.com/romwebclient.html>retrieved on Jun. 12, 2002 the whole document.
Steinfeld, E., "Internet-appliance technology automates test equipment" EDN Magazine, pp. 157-169, Oct. 2000, www.edbmag.com.
Suresh et al., "XML-based Data System for Earth Science Applications", IEEE 2000 International, vol. 3, pp. 242-28, Jul. 2000.
Searls, "The Next Bang: The Expolosive Combination of Embedded Linux, XML, and Instant Mess.", ACM (Sep. 2000) Issue 77 [online] Retrieved from the Internet:<URL:http://www.linuxjournal.com/article.php?sid=4195>, [retrieved on Nov. 20, 2001].
The Simple Times, vol. 7, No. 1, Mar. 1999; [online] Retrieved from the Internet:<URL:http://www.simple-times.org/pub/simple-times/issues/7-1.html> [retrieved on Aug. 3, 2005].
Trewitt, G., "Using Tcl to Process HTML Forms," Digital Network Systems Laboratory, NSL Technical Note TN-14, Palo Alto, CA (Mar. 1994).
Virtual Reality Transfer Protocol (VRTP); Retrieved from the Internet:<URL:http://www.stl.nps.navy.mil/~brutzman/vrtp> (1998).
Walsh, Norman, "XSL The Extensible Style Language: Styling XML Documents," New Architect Daily, Jan. 1999.
Webmethods B2B Whitepaper; [online] Retrieved from the Internet:<URL:http://www.cs.wisc.edu/~vganti/papers/b2b_wpB2Bintegration.html> (1999).
White Paper, Medical Imaging, East Providence, RI (Sep. 1995).
Wigget, Jeremy, "Intraview: Roger Eastvold of Orasis Inc.," 24x7, Nov. 1996.
Williams, T., "Java Goes to Work Controlling Networked Embedded Systems" Computer Design, Pennwell Publ. Littleton, MA, 35:9:36-37, Aug. 1996.
Winer, Dave, "XML-RPC Specification," (http://XML-RPC.com), Jun. 15, 1999.
Winter 1992, Field of View, vol. 2, No. 3, Toshiba America Medical System, Inc.
Wu et al., "A knowledge sharing and collaboration system model based on Internet", Systems, Man, and Cybernetics, 1999. IEEE SMC'99 Conference Proceedings, vol. 2, pp. 148-152 (1999).
Xerox 190 Copier, Electronic Data Interface Operator Guide, ver. 1.0, (1989).
Van der Werff, M., et al., "A Mobile-Based Home Automatic System", IEEE Mobility Conference (2005).
Defense Information Systems Agency, Field Services Office, White Paper Report "pcAnywhere 10.5" (Sep. 2003).
Examination Report in EP Application No. 01955993.9, dated Jan. 29, 2004.
Examination Report in EP Application No. 01955993.9, dated Aug. 5, 2004.
Examination Report in EP Application No. 01955993.9, dated Dec. 16, 2004.
Examination Report in EP Application No. 01973431.8, dated Mar. 8, 2005.
Communication in EP Application No. 01973431.8, dated Mar. 30, 2005.
Examination Report in EP Application No. 01973431.8, dated Jan. 15, 2008.
Office Action in EP Application No. 01996048.3, dated Jun. 22, 2004.
Office Action in EP Application No. 01996048.3, dated Mar. 11, 2005.
Office Action in EP Application No. 01955993.9, dated Jun. 6, 2005.
Examination Report in EP Application No. 03719774.6, dated Sep. 12, 2005.
Examination Report in EP Application No. 03719774.6, dated Apr. 12, 2006.
Examination Report in EP Application No. 01973431.8, dated Feb. 6, 2009.
Search Report in EP Application No. 02792391.1, dated Nov. 19, 2009.
Examination Report in EP Application No. 01973431.8, dated Mar. 23, 2010.
Examination Report in EP Application No. 02792391.1, dated Mar. 10, 2010.
Response to Examination Report in EP Application No. 01973431.8, dated Oct. 4, 2010.
Letter from Foreign Associate regarding response filed in EP Application No. 01973431.8, dated Oct. 8, 2010.
English translation of Notification of Reasons for Refusal in Japanese Application No. 2002-529431, dated Nov. 8, 2010.
Notice of Reasons for Rejection in Japanese Application No. 2002-529431, dated Nov. 8, 2010.
Examination Report in EP Application No. 02792391.1, dated Feb. 27, 2012.
Machine Translation of Japanese Patent Publication No. 09-305407 (Pub Date Nov. 1997).
Machine Translation of Japanese Patent Publication No. 11-296453, (Pub Date Oct. 1999).

(56) References Cited

OTHER PUBLICATIONS

Machine Translation of Japanese Patent Publication No. 11-203079, (Pub Date Jul. 1999).
Machine Translation of Japanese Patent Publication No. 2000-309145, (Pub Date Nov. 2000).
Machine Translation of Japanese Patent Publication No. 2001-337817, (Pub Date Dec. 2001).
Machine Translation of Japanese Patent Publication no. 11-045195, (Pub Date Feb. 1999).
Machine Translation of Japanese Patent Publication No. 2000-163283, (Pub Date Jun. 2000).
Final Decision for Rejection in Japanese Patent Application No. 2002-515578, dated Jul. 10, 2012.
International Search Report in Application No. PCT/US2002/040058, dated Nov. 3, 2003.
International Preliminary Examination Report in Application No. PCT/US2002/040058, dated Jun. 10, 2004.
International Search Report in Application No. PCT/US01/23651, dated Jun. 3, 2002.
International Search Report in Application No. PCT/US01/29787, dated Jun. 28, 2002.
International Preliminary Examination Report in Application No. PCT/US01/29787, dated Aug. 21, 2002.
International Preliminary Examination Report in Application No. PCT/US01/23651, dated Oct. 10, 2002.
International Search Report in Application No. PCT/US01/45198, dated Apr. 29, 2003.
International Search Report in Application No. PCT/US03/11707, dated Sep. 24, 2003.
International Search Report and Written Opinion in Application No. PCT/US03/11701, dated Oct. 13, 2004.
Written Opinion in Application No. PCT/US01/45198, dated May 31, 2007.
International Preliminary Examination Report in Application No. PCT/US01/45198, dated Apr. 2, 2008.
International Preliminary Report on Patentability (incl. Written Opinion) in Application No. PCT/US2007/088858, dated Jul. 9, 2009.
International Search Report &. Written Opinion in Application No. PCT/US2007/088858, dated May 21, 2008.
Summons to attend Oral Proceedings in counterpart EP Application No. 01973431.8, dated Feb. 2, 2011.
Second Auxiliary Response in EP Application No. 01973431.8, dated Apr. 26, 2011.
Oral Proceedings Communication in Application No. EP01973431.8, dated May 12, 2011.
Decision to Refuse in Application No. EP01973431.8, dated Jun. 21, 2011.
Action in Application No. JP 2002-515578, dated Jul. 26, 2011.
Response filed in Application No. JP2002-529431, dated May 2, 2011.
Summons to attend oral proceedings in corresponding European Application No. 01955993.9 dated Oct. 31, 2005.
Result of Consultation of Nov. 24, 2005 and Nov. 25, 2005 from corresponding European Application No. 01955993.
Submission in German dated Nov. 25, 2005 from corresponding European Application No. 01955993.9.
Annex to EPO Form 2004 with claims for grant in European Application No. 01955993.9 (Nov. 29, 2005).
Oral Proceeding Minutes in European Application No. 01955993.9, dated Jan. 16, 2006.
Communication dated Apr. 26, 2005 in European Application No. 01955993.9.
Action and Response History in U.S. Appl. No. 11/537,399.
Action and Response History in U.S. Appl. No. 11/774,474.
Action and Response History in U.S. Appl. No. 09/627,201.
Action and Response History in U.S. Appl. No. 10/805,012.
Action and Response History in U.S. Appl. No. 09/667,737.
Action and Response History in U.S. Appl. No. 11/677,279.
Action and Response History in U.S. Appl. No. 09/716,717.
Action and Response History in U.S. Appl. No. 09/708,384.
Action and Response History in U.S. Appl. No. 11/503,638.
Action and Response History in U.S. Appl. No. 10/123,960.
Action and Response History in U.S. Appl. No. 11/673,943.
Action and Response History in U.S. Appl. No. 10/124,181.
Action and Response History in U.S. Appl. No. 10/028,126.
Action and Response History in U.S. Appl. No. 10/784,138.
Wikipedia, IP Address, Retrieved from Internet on Jun. 6, 2013, http://en.wikipedia.org/wiki/IP_address[Jun. 6, 2013 2:21:27 PM] (8 pages.).
Ennis, Darach, "Cobra and XML Integration in Enterprise Systems", Trinity College Dublin, IONA Technologies Inc.
Citrix Online, Citrix Systems, Inc. Whilte Paper, "GoToMyPC Security", [online] Retrieved from the Internet: URL:http://www.citrix.it/REPOSITORY/docRepository/id_979_1124821417888736.pdf [retrieved on Mar. 16, 2010] (2004).
Citrix Online, Citrix Systems, Inc. Whilte Paper, "GoToMyPC Corporate Technology", [online] Retrieved from the Internet:URL:http://www.gotomypc.com/downloads/pdf/m/GoToMyPC_Corporate_Technology_White_Paper.pdf [retrieved on Mar. 16, 2010] (2004).
EBITS:Electronic Business & Information Technology for Society Research Consortium Internet: <URL: www.cs.dartmouth.edu/~makedon/cs188/proposal.html>.
ExpertCity, Inc., Whilte Paper, "GoToMyPC: Making Life Simpler for Teleworkers and Travelers", [online] Retrieved from the Internet:URL:http://www.si.umich.edu/Classes/540/Placement/GoOvrvew.pdf [retrieved on Mar. 16, 2010] (2001).
http://www.upnp.org/download/UPnPDA10_20000613.htm (pp. 1-52).
"RomWebClient Embedded HTTP client 1-61 Toolkit", Allegrosoft, pp. 1-2, Jul. 9, 2000 Retrieved from the Internet: <URL: http://www.allegrosoft.com/romwebclient.html> , [retrieved on Dec. 6, 2006].
Steinfeld, E., "Making the Change" Document No. XP002201937, Circuit Cellar Online, pp. 1-7, Apr. 2000.
Trewitt, G., "Digital Network Systems Laboratory, NSL Technical Note TN-14, Using Tcl to process HTML Forms".
Wikipedia, "GoToMyPC", [online] retrieved from the Internet:<URL: http://en.wikipedia.org/wiki/Gotomypc> [retrieved on Jan. 21, 2010] (2010).
Office Action in EP Application No. 01973431.8, dated Mar. 8, 2005.
Office Action in EP Application No. 01955993.9, dated Aug. 5, 2004.
Office Action in counterpart EP Application No. 01955993.9, dated Jan. 29, 2004.
Search Report from EP Application No. 01955993.9, dated Dec. 16, 2004.
English translation of Action in Japanese Application No. JP 2002-515578, dated Jul. 26, 2011.
Oral Proceedings in EP Application No. 01955993.9, 7 pages, dated Jan. 16, 2006.
Action and Response History in U.S. Appl. No. 13/329,928.
Action and Response History in U.S. Appl. No. 11/616,136 through Nov. 16, 2010.
Action and Response History in U.S. Appl. No. 10/784,138, on Sep. 23, 2010.
Action and Response History in U.S. Appl. No. 11/538,402, on May 17, 2011.
Office action with English translation issued Oct. 1, 2013 in Japanese application No. 2012-245293 (7 pages).
Response to Office Action with English translation filed Dec. 26, 2013 in Japanese application No. 2012-245293 (22 pages).
Wikipedia, Java (software platform), http://en.wikipedia.org/wiki/java_(software_platform), Jul. 11, 2013 (12 pages).

* cited by examiner

RETRIEVING DATA FROM A SERVER

CROSS-REFERENCE TO RELATED APPLICATION

This application is a continuation of U.S. patent application Ser. No. 10/124,181, filed Apr. 17, 2002, now U.S. Pat. No. 8,108,543 which is a continuation-in-part of U.S. patent application Ser. No. 09/667,737, filed on Sep. 22, 2000 (now U.S. Pat. No. 7,185,014). U.S. patent application Ser. No. 10/124,181 and U.S. Pat. No. 7,185,014 are hereby incorporated by reference into this patent application as if set forth herein in full.

BACKGROUND

This invention relates to a controller embedded in a device (an "embedded controller") that retrieves data from a remote server for a specific instance of the device.

A device may contain an embedded controller, such as a microprocessor, to monitor and control its operation. Any type of device may have an embedded controller, including, but not limited to, home appliances, such as washing machines, dishwashers, and televisions, and manufacturing equipment, such as robotics, conveyors and motors.

Embedded controllers, also referred to as "embedded devices", are often connected to an internal network, such as a local area network (LAN), with an interface to the Internet. Other devices on the internal network may communicate with the embedded controllers over the internal network. However, the embedded controllers are not generally addressable from the Internet.

SUMMARY

In general, in one aspect, the invention is directed to a controller embedded in a device for retrieving data from a server. The controller sends a command to the server that identifies an instance of the device and receives, from the server and in response to the command, data that is specific to the instance of the device. The data identifies additional data to retrieve for the device.

This aspect of the invention may include one or more of the following. The command may include an operational parameter for the device and the data may include an updated value for the operational parameter. The command may include plural operational parameters for the device and the data may include updated values that differ from current values of the operational parameters.

The data may include a list of operational parameters. In this case, the embedded controller sends a second command to the server, which includes operational parameters from the list, and receives, from the server and in response to the second command, updated values of one or more of the operational parameters included in the second command. The data may include a list of operations to be performed by the controller. In this case, the embedded controller parses the operations from the list and performs the operations from the list.

The data may include a configuration file for the device. The command identifies the instance of the device by a device type and/or one or more of a serial number and a universal unique identifier. The embedded controller sends the command to the server periodically. The server runs the Hypertext Transfer Protocol and the command contains Extensible Markup Language code. The device receives the data via the Hypertext Transfer Protocol.

The command may include a first operational parameter for the device and the data may include a second operational parameter that is unrelated to the first operational parameter. The data may include a uniform resource locator. The uniform resource locator is used to obtain additional data that relates to the device. The data may include an indication that additional data for the device is present at the server. A second command is sent to the server to retrieve the additional data. The server retrieves the additional data in response to the second command. Parameters in the command determine a content of the data. The data may be encrypted when the data is received and then decrypted. The data may contain a digital signature when the data is received, which is then authenticated. The data may include a list of operations to be performed by the controller. The list of operations includes Simple Object Access Protocol calls that are scripted using Extensible Markup Language.

In general, in another aspect, the invention is directed to a server for sending data over a network to a controller embedded in a device. The server receives a command from the embedded controller, identifies an instance of the device from information in the command, retrieves data that is specific to the instance of the device, and sends the data to the embedded controller. The data identifies additional data for the embedded controller to retrieve.

This aspect of the invention may include one or more of the following features. The command may include a device type and/or one or more of a serial number and a universal unique identifier. The instance of the device may be identified based on the device type and/or one or more of the serial number and the universal unique identifier. The server may parse the device type and one or more of the serial number and universal unique identifier from the command prior to identifying the instance of the device.

The command may include an operational parameter for the device. The data may include an updated value of the operational parameter. The data may include a list of operational parameters for the device. The server receives a second command from the embedded controller, which includes an operational parameter from the list of operational parameters, obtains an updated value of the operational parameter, and sends the updated value of the operational parameter to the embedded controller.

The data may include a list of operations to be performed by the embedded controller. The data may include a configuration file for the device. The server may receive the data specific to the instance of the device and store the data in memory, from which it is retrieved. The data specific to the instance of the device may be received via a Web page generated by the server. The server may run the Hypertext Transfer Protocol and the command may contain Extensible Markup Language code. The data may be stored in a queue and retrieved from the queue.

In general, in another aspect, the invention is directed to a system that includes a controller embedded in a device that is capable of communicating over a computer network, and a server that is capable of communicating over the computer network. The embedded controller sends a command to the server over the computer network that identifies an instance of the device and, in response, the server (i) identifies the instance of the device based on the command, (ii) retrieves data that is specific to the instance of the device, and (iii) sends the data to the embedded controller over the computer network. The data identifies additional data for the embedded controller to retrieve.

This aspect of the invention may include one or more of the following features. The embedded controller is not remotely-addressable from the computer network. The computer network is the Internet. The server runs the Hypertext Transfer Protocol and the command may contain Extensible Markup Language code.

Other features and advantages of the invention will become apparent from the following description, including the claims and drawings.

DESCRIPTION

Figure 1:
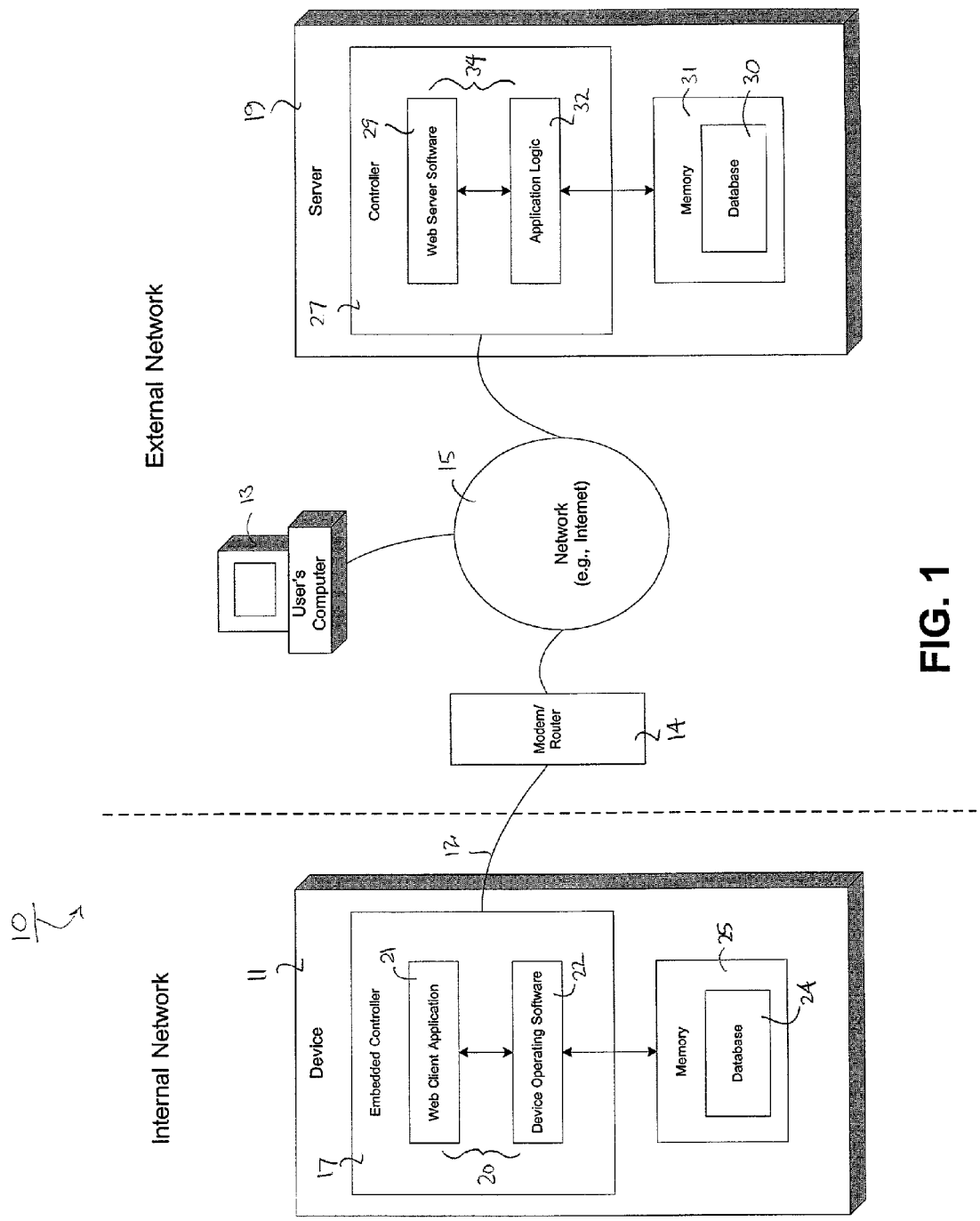
FIG. 1 is a block diagram of a network containing a server and a device having an embedded controller.

FIG. 1 shows a network 10. Network 10 includes a device 11 containing an embedded controller 17. Device 11 is any type of apparatus or system having functions that are monitored and controlled by embedded controller 17.

Device 11 is connected to an internal network 12, such as a LAN. A router or modem 14 couples internal network 12 to an external network 15, such as the Internet/World Wide Web (Web). External network 15 runs TCP/IP (Transmission Control Protocol/Internet Protocol) or some other suitable protocol. Network connections are via Ethernet, telephone line, wireless, or other transmission media.

External network 15 contains a server 19, which is a computer or any other processing device. Server 19 communicates with embedded controller 17 over external network 15 and internal network 12. Embedded controller 17 has a local IP (Internet Protocol) address that can be resolved within internal network 12. However, this local IP address may not be recognizable by devices on external network 15, such as server 19. As such, server 19 may not be able to directly address device 11.

Embedded Controller

Embedded controller 17 runs software 20, which includes web client application 21 and operating software 22. Web client application 21 includes a TCP/IP protocol stack that allows embedded controller 17 to communicate over external network 15. Device operating software 22 provides an interface between Web client application 21 and a database 24. Through device operating software 22, embedded controller 17 retrieves data stored in database 24 and stores data in database 24.

Database 24 is stored in a memory 25 on device 11 or internal to embedded controller 17. Database 24 stores data, including operational parameters, configuration files, and identification information for device 11.

The operational parameters constitute settings and/or control instructions for the device 11, which are implemented by embedded controller 17. The types of operational parameters that are stored in database 24 depend on the nature of device 11. For example, if device 11 is a heating/cooling system, the operational parameters may include temperature levels, humidity levels, airflow controls, vent/duct open/close controls, and fan motor speed settings. A configuration file is a file that contains a set of one or more operational parameters for an instance of device 11.

What is meant by "instance" is the specific identity of device 11 as distinguished from other identical devices. The identification information stored in database 24 identifies the instance of device 11. This identification information includes, but is not limited to, data identifying the type of the device, a common (or "friendly") name for the device, the manufacturer of the device, the model name of the device, the model number of the device, the serial number of the device, and a universal unique identifier (UUID) for the device.

The device type specifies a uniform resource locator (URL) for the device, which includes the name of the device. This information identifies a Web site that is associated with, and generated by, server 19 for the device. For example, a device type might be:

www.SonyVideo.com/television/Wega/XBR400 for a Sony® Wega® XBR400® television that includes an embedded controller. The common name of the device is how the device is known in the vernacular, e.g., "television". The manufacturer identifies the manufacturer of the device, e.g., Sony®. The model name identifies the particular model of the device, e.g., Wega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-0050DAB7BAC5. Of the data shown above, only the serial number and the UUID are unique to the instance of device 11.

Server

Server 19 is a computer that runs HTTP (Hypertext Transfer Protocol). Server 19 includes a controller 27, such as a microprocessor, for executing software to perform the functions described below. To avoid confusion in terminology, the following reads as though those functions are performed by server 19, even though software in controller 27 of server 19 performs the functions.

Server 19 executes Web server software 29 to communicate over external network 15. Web server software 29 also hosts a Web page associated with device 11. The Web page (not shown) is displayed on computer 13 of a user, such as the owner of device 11, who may input updated operational parameters for the device. These input updated operational parameters are transmitted to Web server software 29 over external network 15. Web server software 29 stores the updated parameters in database 30.

Web server software 29 stores and retrieves data in database 30 using application logic 32. Application logic 32 is software for accessing database 30 using the CGI (Common Gateway Interface) protocol. CGI is a well-known protocol for accessing a database. The operational parameters can be stored in database 30 individually or as part of a configuration file for an instance of device 11.

Database 30 is stored in a memory 31, which is inside of, or external to, server 19. Database 30 stores data associated with device 11, including the operational parameters noted above. Other data that may be stored for device 11 is described below.

The Data Transfer Process

Figure 2:
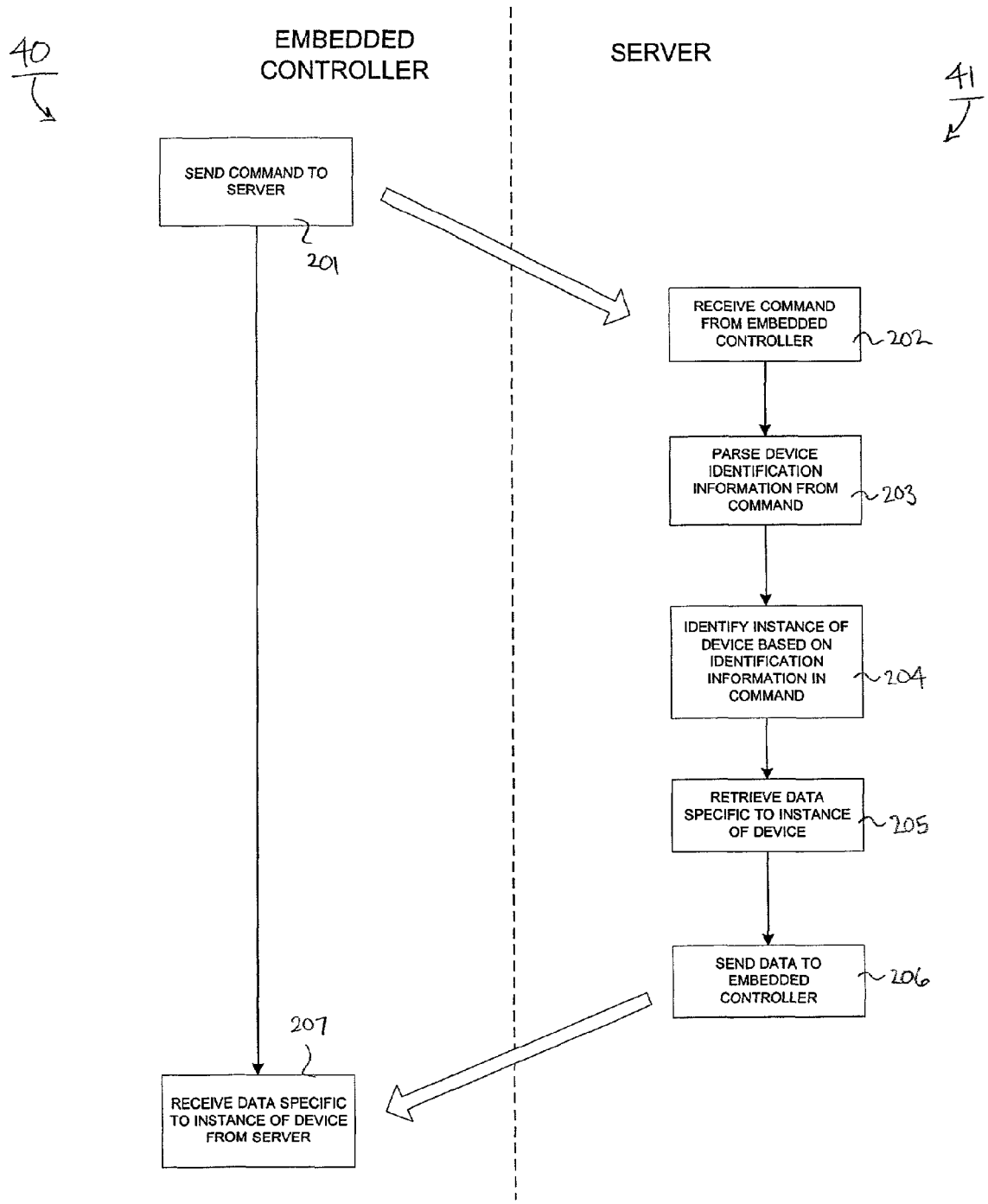
FIG. 2 is a flowchart showing a process by which the embedded controller retrieves data for the device from the server.

Embedded controller 17 executes software 20 to retrieve data, such as operational parameters, from remote server 19. Server 19 executes software 34 to send the data to embedded controller 17. FIG. 2 shows these processes in detail. The left half of FIG. 2, titled "Embedded Controller" shows process 40 performed by embedded controller 17, and the right half of FIG. 2, titled, "Server", shows process 41 performed by server 19.

Process 40 generates and sends (201) a command to server 19. The command, or a modified version thereof, is sent by embedded controller 17 to server 19 periodically. It is through this command that embedded controller 17 polls server 19 to determine if there are any new/updated operational parameters for device 11.

The command includes data identifying device 11. The data identifies the specific instance of device 11 and includes a device type field and one or both of a device serial number field and a device QUID. The command may also include the common name field, the manufacturer name field, the model name field, and the model number field, as set forth above.

The command may be either an HTTP GET command or an HTTP post command. The data included in those commands is similar, with the difference being that the HTTP GET command retrieves a document, such as a configuration file, that contains operational parameters and the HTTP POST command retrieves individual operational parameters. An example of an HTTP GET command is shown in Appendix A and an example of an HTTP POST command is shown in Appendix B.

The HTTP POST and GET commands shown in Appendices A and B contain XML (eXtensible Markup Language) commands. XML is a self-describing computer language in the sense that fields in the XML code identify variables and their values in the XML code. For example, as shown in the Appendices, the "manufacturer" field identifies a manufacturer, e.g., Sony®, and is delineated by "<manufacturer>" to indicate the start of the field and "</manufacturer>" to indicate the end of the field. XML is used because it can be generated, parsed and read relatively easily by server 19 and embedded controller 17.

As noted, the GET command is used to retrieve a document from server 19. The document to be retrieved corresponds to the fields in the GET command, in particular to the device type, serial number and/or UUID fields. By contrast, the POST command is used to retrieve individual operational parameters. The operational parameters that are to be retrieved are listed in the POST command itself. Changing these parameters changes the information the server provides to the embedded controller. By way of example, as shown in Appendix B, the operational parameters include airflow, humidity, motor and vent values for the fictitious "widget" device. The current values of these parameters are specified in the POST command shown in Appendix B as follows:

```
<parameters>
    <Airflow xsd:type="integer">378</Airflow>
    <Humidity xsd:type="double">46.7</Humidity>
    <Motor xsd:type="integer">1500</Motor>
    <Vent xsd:type="integer">4</Vent>
</parameters>
```

The updated values of these parameters are returned by server 19 to embedded controller 17 in a reply POST command. The updated values of these parameters are specified in the POST command shown in Appendix B as follows:

```
<parameters>
    <Motor xsd:type="integer">1250</Motor>
    <Vent xsd:type="integer">2</Vent>
</parameters>
```

As shown, both the POST and GET commands include the URL of the device in the device type field. As described below, this directs server 19 to a Web site associated with device 11 and, thereafter, in the case of a GET Command, to retrieve a specific Web page that is generated for the device by server 19 or any other device in communication with network 15. It is noted that, since the POST command retrieves parameters, not a document like the GET command, the POST command need not include a URL of the device.

Referring back to FIG. 2, process 41 (in server 19) receives (202) the command from embedded controller 17. Process 41 identifies the command as either a POST or GET command based on a header, such as "POST/CONTROL HTTP/1.1" (see the headers in Appendices A and B), in the command. Process 41 uses an XML parser to parse (203) the various identifying fields, such as device type, serial number, and UUID, from the command.

Process 41 identifies (204) the instance of device 11 based on the information parsed from the command. That is, process 41 uses the device type, serial number, and UUID field information to identify the instance.

If The Command is a POST Command

The remaining identification information from the command is used to narrow the search through database 30 down to data for the specific instance of device 11. The device serial number and/or UUID are used to retrieve operational parameters specific to device 11.

Once the appropriate data has been identified (204), process 41 retrieves (205) that data using application logic 32. Process 41 compares the values of the operational parameters to those included in the POST command. If the values are the same, process 41 returns an indication that there are no new/updated values for device 11. If the values of the operational parameters are different, process 41 adds the appropriate updated value fields to the POST command and sends (206) the POST command, with the updated operational parameters, back to embedded controller 17. Thus, only those operational parameters that differ from their original values are returned to embedded controller 17 in the POST command.

If the Command is a GET Command

As was the case above with the POST command, the remaining identification information from the command is used to narrow the search through database 30 down to data for the specific instance of device 11. In particular, the device serial number and/or UUID are used to retrieve (205) a configuration file that is specific to device 11. Process 41 sends (206) the configuration file to embedded controller 17. The configuration file may be a Web page identified by the URL in the device type field. This Web page is generated by server 19 using parameters stored in database 30 and then sent to device 11. It is noted that the complete Web page itself need not be stored. Alternatively, the GET command may retrieve separate configuration files and Web pages.

Process 40 in embedded controller 17 receives (207) the data (operational parameters or configuration file) from server 19 in response to sending (201) the command. Process 40 uses the data to update/reset device 11. For example, if device 11 is a heating system, a new operational parameter may be a new temperature setting for its thermostat. In this example, embedded controller 17 sets the new temperature accordingly. If the device is a television, a new operational parameter may indicate that certain pay television stations are now available. In this case, embedded controller 17 performs any appropriate decoding/descrambling functions on the television signal.

For both the POST and GET commands, the reply from server 19 to embedded controller 17 may contain a URL. The URL directs embedded controller 17 to a Web site that contains additional information, e.g., operational parameters and the like, for device 11. Embedded controller 17 may then retrieve any necessary information from that Web site. Additionally, the reply may contain an indication that server 19 contains additional data for embedded controller 17 to retrieve. In this case, embedded controller issues a new POST or GET command, whichever is appropriate based on the additional data identified in the reply, and processes 40,41 described herein are repeated to retrieve the additional data from server 17. The initial command and/or reply may be encrypted by server 11 and decrypted by embedded controller 17. Any of a number of commercially-available encryption technologies may be used. Server 17 may also incorporate a digital signature into the reply. Embedded controller 17 authenticates the digital signature when it receives the reply, thereby authenticating the reply.

Process 41 may also add value fields to the POST or GET command that are unrelated to the fields originally included in the POST or GET commands output by controller 17. For example, if the data retrieved (205) by process 41 includes additional parameters that require updating and that were not included in an original POST command, process 41 adds the necessary fields and parameters to the POST command that it returns to embedded controller 17. In this regard, server 11 may store data to be delivered to controller 17 in a queue. When controller 17 next contacts server 11, the data from the queue may be transferred to controller 17, regardless of whether the data corresponds to data in the original command.

Alternative Embodiment

Figure 3:
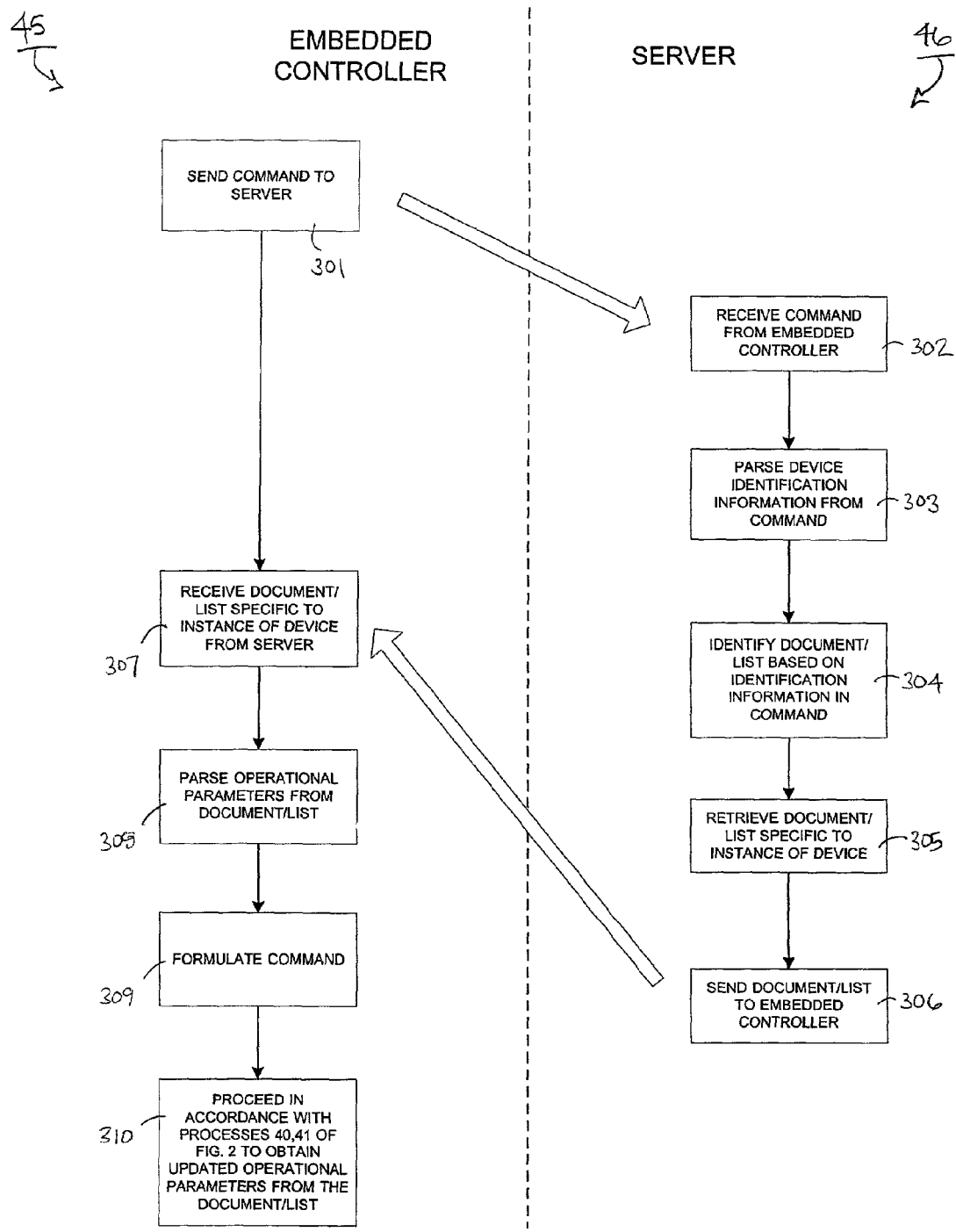
FIG. 3 is a flowchart showing an alternative process by which the embedded controller retrieves data for the device from the server.

FIG. 3 shows alternative embodiments of processes 40,41. In processes 40,41, the GET and POST commands request the same parameters each time the commands are issued. The parameters requested are "hard-coded" in the software that implements process 40. This embodiment provides a way to change the parameters that are requested without altering the software that generates the request/command.

Referring to FIG. 3, process 45 in embedded controller 17 begins by sending (301) a command to server 19. The command, in this case, is an HTTP GET command, since it is requesting a document, not individual operational parameters. The document is an XML document that contains a list of operational parameters to be updated. Using this document, embedded controller 17 can change the operational parameters that it periodically updates.

Process 46 in server 19 receives (302) the command from embedded controller 17, parses (303) the command using an XML parser to obtain the information specific to the instance of device 11, and identifies (304) the appropriate document based on this information. As before, the information that identifies the instance of device 11 includes, among other things, the device type, its serial number, and its UUID. Process 46 retrieves (305) the document containing the list of operational parameters to be updated, and sends (306) the document back to embedded controller 17.

Process 45 in embedded controller 17 receives (307) the document from server 19, parses (308) the operational parameters to be updated from the document, and formulates (309) a POST command to send to server 19. The command is formulated using a command template (not shown), into which process 45 inserts the operational parameters parsed from the document. Process 45 sends this second command to the server. At this point, processes 45 and 46 operate (310) in the same manner as processes 40 and 41, respectively, when used with a POST command. Accordingly, the details of processes 40,41 are not repeated here.

This alternative embodiment may be generalized further. For example, rather than simply retrieving a list of operational parameters, embedded controller 17 may retrieve, from server 19, a list of operations that it is to perform. For example, that list may contain operational parameters to be updated, times at which the updates are to occur, a schedule of diagnostic tests, and the like. Any operation that may be performed by embedded controller 17 may be included on the list.

The operations in the list may be Simple Object Access Protocol (SOAP) calls that are scripted using XML. Briefly, SOAP is a recognized standard for performing remote procedure calls. Scripting of SOAP calls using XML is described in U.S. patent application Ser. No. 10/123960, filed concurrently herewith and entitled "XML Scripting of SOAP Commands", the contents of which are hereby incorporated by reference into this application as if set forth herein in full.

The process for retrieving the list of operations is identical to processes 45 and 46, save for the contents of the list itself. The actions that embedded controller takes once it has the list (i.e., 310) depend on the contents of the list. For example, the list might specify that parameters are to be updated every hour and may also contain a list of the parameters to be updated. The list may contain XML commands, which can be parsed by embedded controller 17. Thus, embedded controller 17 reads the commands in the list and performs the appropriate operations with respect to device 11.

Architecture

Processes 40,41 and 45,46 are not limited to use with the hardware/software configuration of FIG. 1; they may find applicability in any computing or processing environment. Processes 40,41 and 45,46 may be implemented in hardware (e.g., an ASIC {Application-Specific Integrated Circuit} and/or an FPGA {Field Programmable Gate Array}), software, or a combination of hardware and software.

Processes 40,41 and 45,46 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40,41 and 45,46.

Processes 40,41 and 45,46 may also be implemented as a computer-readable storage medium, configured with a computer program, where, upon execution, instructions in the computer program cause the computer to operate in accordance with processes 40,41 and 45,46.

The invention is not limited to use with the protocols and standards described above. For example, Web server 19 may use Java Servlets, ASP (Active Server Pages), and/or ISAPI (Internet Server Application Programming Interface) to communicate with application logic 32, instead of, or in addition to, CGI. The commands sent by embedded controller 17 and/or server 19 (e.g., in 201, 301, 310) are not limited to HTTP GET and POST commands. Any commands and/or requests for requesting and receiving data may be used.

The data transferred to embedded controller 17 by server 19 is not limited to operational parameters or configuration files. The data may include, for example, a schedule of actions to be performed by device 11 that is based on information pertaining the owner of the device. For example, owner preferences may be stored in database 30. The instance-specific data may be used by server 19 to correlate the owner of the device to the appropriate preferences. These preferences then may be transmitted back to device 11 to control the operation thereof.

The original parameters sent by embedded controller 17 to server 19 may be used by server 19 to calculate new, updated parameters based on data stored in database 30. Thus, the invention is not limited to simply retrieving updated data, but may also include calculating new data based on currently-available data.

The documents and commands described above are not limited to XML format. Any computer language may be used for the commands. The documents may be in any format, for example, HTML (Hypertext Markup Language) documents may be used. In addition, the invention is not limited to use with the Web, Web servers, and the like. The servers and embedded controllers described herein may be the same type of general-purpose computer appropriately programmed, or different devices.

Other embodiments not described herein are also within the scope of the following claims.

What is claimed is:

1. A method performed by a controller that monitors and/or controls an apparatus, the method comprising:
   sending a command to a server requesting a document, the document containing operational parameters to be updated and times at which updates are to occur;
   receiving the document from the server;
   obtaining one or more operational parameters for the apparatus to be updated using the document, the one or more operational parameters being from the document;
   polling the server by sending a message to the server, the message containing information that distinguishes the apparatus from other identical apparatuses, the message comprising a hypertext transfer protocol (HTTP) message and the one or more operational parameters for the apparatus;
   receiving, in a reply from the server and in response to the message, data that is specific to the apparatus, the data comprising one or more updated values for the one or more operational parameters, the one or more updated values having been determined by the server using the one or more operational parameters sent to the server; and
   using the data to affect at least one of:
   a configuration of the apparatus, or
   an operation of the apparatus;
   wherein the controller is on an internal network and the server is on an external network, and wherein the controller has a local address that is not recognizable from the external network.

2. The method of claim 1, wherein the data comprises updated values that differ from previous values of the operational parameters.

3. The method of claim 1, further comprising receiving, in a reply from the server and in response to the message, a schedule of actions,
   wherein the schedule of actions comprises operations to be performed by the controller; and
   wherein using the data further comprises:
   parsing operations from the schedule; and
   performing the operations to affect at least one of the configuration of the apparatus or the operation of the apparatus.

4. The method of claim 1, wherein the message identifies the apparatus by a type and/or one or more of a serial number and a universal unique identifier.

5. The method of claim 1, wherein the HTTP command contains Extensible Markup Language code.

6. A method performed by a server for sending data to a controller that monitors and/or controls an apparatus, the method comprising:
   receiving a command from the controller requesting a document;
   sending the document to the controller, the document containing operational parameters to be updated and times at which the updates are to occur;
   receiving a message from the controller, the message comprising a hypertext transfer protocol (HTTP) message and one or more operational parameters from the document for the apparatus;
   identifying the apparatus from information in the message, the information distinguishing the apparatus from other apparatuses;
   determining data that is specific to the apparatus, the data comprising one or more updated values of the one or more operational parameters that are determined by the server using the one or more operational parameters received from the controller; and
   sending the data from the server to the controller in a reply to the message, the data for affecting at least one of:
   a configuration of the apparatus, or
   an operation of the apparatus;
   wherein the controller is on an internal network and the server is on an external network, and wherein the controller has a local address that is not recognizable from the external network.

7. The method of claim 6, wherein:
   the information in the message comprises a type and/or one or more of a serial number and a universal unique identifier; and
   the apparatus is identified based on the type and/or one or more of the serial number and the universal unique identifier.

8. The method of claim 7, further comprising:
   parsing the type and one or more of the serial number and universal unique identifier from the message prior to identifying the apparatus.

9. The method of claim 6, wherein the updated values of the operational parameters differ from previous values of the operational parameters.

10. The method of claim 6, wherein the reply comprises a schedule of actions that comprises operations to be performed by the controller.

11. The method of claim 6, further comprising:
    receiving the data specific to the apparatus from a Web site; and
    storing the data in memory;
    wherein the data is retrieved from the memory.

12. A non-transitory machine-readable medium storing instructions that are executable by a controller to monitor and/or control an apparatus, the instructions being executable to perform operations comprising:

sending a command to a server requesting a document, the document containing operational parameters to be updated and times at which updates are to occur;

receiving the document from the server;

obtaining one or more operational parameters for the apparatus to be updated using the document, the one or more operational parameters being from the document;

polling the server by sending a message to the server, the message containing information that distinguishes the apparatus from other identical apparatuses, the message comprising a hypertext transfer protocol (HTTP) message and the one or more operational parameters for the apparatus;

receiving, in a reply from the server and in response to the message, data that is specific to the apparatus, the data comprising one or more updated values for the one or more operational parameters, the one or more updated values having been determined by the server using the one or more operational parameters sent to the server; and using the data to affect at least one of:
 a configuration of the apparatus, or
 an operation of the apparatus;

wherein the controller is on an internal network and the server is on an external network, and wherein the controller has a local address that is not recognizable from the external network.

13. The non-transitory machine-readable medium of claim 12, wherein the data comprises updated values that differ from previous values of the operational parameters.

14. The non-transitory machine-readable medium of claim 12, wherein the operations comprise receiving, in a reply from the server and in response to the message, a schedule of actions,
 wherein the schedule of actions comprises operations to be performed by the controller; and
 wherein using the data further comprises:
  parsing operations from the schedule; and
  performing the operations to affect at least one of the configuration of the apparatus or the operation of the apparatus.

15. The non-transitory machine-readable medium of claim 12, wherein the message identifies the apparatus by a type and/or one or more of a serial number and a universal unique identifier.

16. The non-transitory machine-readable medium of claim 12, wherein the HTTP command contains Extensible Markup Language code.

17. A non-transitory machine-readable medium storing instructions that are executable by a server to send data to a controller to monitor and/or control an apparatus, the instructions being executable to perform operations comprising:
 receiving a command from the controller requesting a document;
 sending the document to the controller, the document containing operational parameters to be updated and times at which the updates are to occur;
 receiving a message from the controller, the message comprising a hypertext transfer protocol (HTTP) message and one or more operational parameters from the document for the apparatus;
 identifying the apparatus from information in the message, the information distinguishing the apparatus from other apparatuses;
 determining data that is specific to the apparatus, the data comprising one or more updated values of the one or more operational parameters that are determined by the server using the one or more operational parameters received from the controller; and
 sending the data from the server to the controller in a reply to the message, the data for affecting at least one of:
  a configuration of the apparatus, or
  an operation of the apparatus;
 wherein the controller is on an internal network and the server is on an external network, and wherein the controller has a local address that is not recognizable from the external network.

18. The non-transitory machine-readable medium of claim 17, wherein:
 the information in the message comprises a type and/or one or more of a serial number and a universal unique identifier; and
 the apparatus is identified based on the type and/or one or more of the serial number and the universal unique identifier.

19. The non-transitory machine-readable medium of claim 18, further comprising:
 parsing the type and one or more of the serial number and universal unique identifier from the message prior to identifying the apparatus.

20. The non-transitory machine-readable medium of claim 17, wherein the updated values of the operational parameters that differ from previous values of the operational parameters.

21. The non-transitory machine-readable medium of claim 17, wherein the reply comprises a schedule of actions that comprises operations to be performed by the controller.

22. The non-transitory machine-readable medium of claim 17, further comprising:
 receiving the data specific to the apparatus from a Web site; and
 storing the data in memory;
 wherein the data is retrieved from the memory.

23. An apparatus comprising:
 memory to store instructions that are executable; and
 a controller to monitor and/or control the apparatus, the controller for executing the instructions to perform operations comprising:
  sending a command to a server requesting a document, the document containing operational parameters to be updated and times at which updates are to occur;
  receiving the document from the server;
  obtaining one or more operational parameters for the apparatus to be updated using the document, the one or more operational parameters being from the document;
  polling the server by sending a message to the server, the message containing information that distinguishes the apparatus from other identical apparatuses, the message comprising a hypertext transfer protocol (HTTP) message and the one or more operational parameters for the apparatus;
  receiving, in a reply from the server and in response to the message, data that is specific to the apparatus, the data comprising one or more updated values for the one or more operational parameters, the one or more updated values having been determined by the server using the one or more operational parameters sent to the server; and
  using the data to affect at least one of:
   a configuration of the apparatus, or
   an operation of the apparatus;
  wherein the controller is on an internal network and the server is on an external network, and wherein the controller has a local address that is not recognizable from the external network.

24. A server comprising:

memory storing instructions that are executable; and a processing device to execute the instructions to send data to a controller to monitor and/or control an apparatus, the instructions being executable to perform operations comprising:

receiving a command from the controller requesting a document;

sending the document to the controller, the document containing operational parameters to be updated and times at which the updates are to occur;

receiving a message from the controller, the message comprising a hypertext transfer protocol (HTTP) message and one or more operational parameters from the document for the apparatus;

identifying the apparatus from information in the message, the information distinguishing the apparatus from other apparatuses;

determining data that is specific to the apparatus, the data comprising one or more updated values of the one or more operational parameters that are determined by the server using the one or more operational parameters received from the controller; and sending the data from the server to the controller in a reply to the message, the data for affecting at least one of:

a configuration of the apparatus, or an operation of the apparatus;

wherein the controller is on an internal network and the server is on an external network, and wherein the controller has a local address that is not recognizable from the external network.

25. The method of claim 6, wherein the operations comprise:

receiving the data specific to the apparatus from a Web site; and storing the data in memory;

wherein the data is retrieved from the memory.

26. The apparatus of claim 23, wherein the data comprises updated values that differ from previous values of the operational parameters.

27. The apparatus of claim 23, wherein the operations comprise receiving, in a reply from the server and in response to the message, a schedule of actions, wherein the schedule of actions comprises operations to be performed by the controller; and wherein using the data further comprises:

parsing operations from the schedule; and performing the operations to affect at least one of the configuration of the apparatus or the operation of the apparatus.

28. The apparatus of claim 23, wherein the message identifies the apparatus by a type and/or one or more of a serial number and a universal unique identifier.

29. The apparatus of claim 23, wherein the HTTP command contains Extensible Markup Language code.

30. The server of claim 24, wherein:

the information in the message comprises a type and/or one or more of a serial number and a universal unique identifier; and the apparatus is identified based on the type and/or one or more of the serial number and the universal unique identifier.

31. The server of claim 30, wherein the operations comprise:

parsing the type and one or more of the serial number and universal unique identifier from the message prior to identifying the apparatus.

32. The server of claim 24, wherein updated values of the operational parameters differ from previous values of the operational parameters.

33. The server of claim 24, wherein the reply comprises a schedule of actions that comprises operations to be performed by the controller.

* * * * *

UNITED STATES PATENT AND TRADEMARK OFFICE
CERTIFICATE OF CORRECTION

PATENT NO. : 8,762,497 B2
APPLICATION NO. : 13/329928
DATED : June 24, 2014
INVENTOR(S) : James R. Hansen Page 1 of 1

It is certified that error appears in the above-identified patent and that said Letters Patent is hereby corrected as shown below:

In the Claims

Column 12, Line 27, In Claim 20, before "differ" delete "that".

Signed and Sealed this
Fourth Day of November, 2014

Michelle K. Lee
*Deputy Director of the United States Patent and Trademark Office*